US012732263B2

(12) United States Patent
Regunathan

(10) Patent No.: US 12,732,263 B2

(45) Date of Patent: Sep. 8, 2026

(54) DYNAMIC INROUTE RECONFIGURATION IN SATELLITE SYSTEMS

(71) Applicant: HUGHES NETWORK SYSTEMS, LLC, Germantown, MD (US)

(72) Inventor: Murali Regunathan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 934 days.

(21) Appl. No.: 17/170,186

(22) Filed: Feb. 8, 2021

(65) Prior Publication Data

US 2022/0131600 A1 Apr. 28, 2022

Related U.S. Application Data

(60) Provisional application No. 63/105,902, filed on Oct. 27, 2020.

(51) Int. Cl.

*H04B 7/185* (2006.01)
*H04W 40/24* (2009.01)

(52) U.S. Cl.

CPC ..... *H04B 7/18519* (2013.01); *H04B 7/18513* (2013.01); *H04W 40/248* (2013.01)

(58) Field of Classification Search

CPC ............ H04B 7/18513; H04B 7/18519; H04B 7/18523; H04B 7/18528; H04B 7/18582; H04B 7/18584; H04B 7/18586; H04W 28/02; H04W 36/14; H04W 40/248; H04W 72/04

See application file for complete search history.

(56) References Cited

U.S. PATENT DOCUMENTS

| | | | | |
|---|---|---|---|---|
| 6,091,933 | A | 7/2000 | Sherman et al. | |
| 7,656,813 | B2 * | 2/2010 | Kloper | H04W 28/24 370/332 |
| 8,341,266 | B2 * | 12/2012 | Olariu | H04W 8/04 725/95 |
| 9,479,993 | B2 * | 10/2016 | Benammar | H04W 36/14 |
| 9,716,547 | B2 * | 7/2017 | Roos | H04B 7/18528 |
| 9,749,928 | B2 * | 8/2017 | Benammar | H04W 36/14 |
| 10,020,877 | B2 * | 7/2018 | Roos | H04B 7/18508 |
| 10,277,310 | B2 * | 4/2019 | Peponides | H04B 7/18513 |
| 10,499,256 | B2 * | 12/2019 | Roos | H04B 7/1853 |
| 2001/0000455 | A1 | 4/2001 | Chao | |
| 2012/0170594 | A1 | 7/2012 | Davis et al. | |

(Continued)

OTHER PUBLICATIONS

International Seach Report and Written Opinion issued in Application No. PCT/US2021/056825, dated Feb. 10, 2022.

(Continued)

*Primary Examiner* — Alpus Hsu

(74) *Attorney, Agent, or Firm* — Potomac Technology Law, LLC

(57) ABSTRACT

A method and apparatus are disclosed for dynamic inroute reconfiguration. A set of factors is selected for use in reconfiguring inroutes in a satellite communication system. A state is defined to represent inroute layouts based on the set of factors. A metric is determined and optimized to obtain a new state representative of a desired inroute layout. The inroute layouts of the satellite communication system are reconfigured to correspond with the inroute layouts represented by the new state.

20 Claims, 22 Drawing Sheets

(56) References Cited

U.S. PATENT DOCUMENTS

| | | | |
|---|---|---|---|
| 2013/0136004 | A1 | 5/2013 | Torres et al. |
| 2016/0072574 | A1 | 3/2016 | Xu et al. |

OTHER PUBLICATIONS

Zheng, et al., "Generic Optimization of Linear Precoding in Multibeam Satellite Systems", IEEE Transactions on Wireless Communications 11.6 (2012); 2308-2320, Sep. 4, 2011.

* cited by examiner

4M ~ Red
2M ~ Blue
1M - Black

4M – Red
2M – Blue
1M – Black
0.5M- Green

DYNAMIC INROUTE RECONFIGURATION IN SATELLITE SYSTEMS

The present application claims priority to U.S. Provisional Patent Application No. 63/105,902 filed Oct. 27, 2020, and entitled "Dynamic Inroute Reconfiguration In Satellite Systems", the entire disclosure of which is incorporated herein by reference.

BACKGROUND INFORMATION

Modern communication systems allow consumers to maintain connectivity, regardless of their location. Many consumers are capable of utilizing different types of terminals (e.g., mobile phones, satellite phones, etc.) while traveling or moving through different geographic locations. Satellite communication systems are at least one type of communication system which facilitates such mobility to consumers. As the number of consumers and desired content increases, it also becomes necessary to monitor system status in order to maintain appropriate quality of service.

Communication systems, such as satellite communication systems, are extremely complicated and incorporate a large number of subsystems which must be properly integrated for proper functionality. Such systems can include multiple beams and multiple terminals operating within the beams. The system often carries different types of traffic with different priority levels, or quality of service (QoS). Efficient QoS in a satellite network is a very important item due, in part, to subscription services that require certain guaranteed features. While the forward link (or outroute) of a high throughput satellite is typically very wide in bandwidth, the return link (or inroute) of satellite terminals is comparatively narrow. For example, the return link for terminals comprises multiple Time Division Multiple Access (TDMA) channels. These channels can be configured with various symbol rates and modulation type.

The system can define different inroute layouts, where the inroutes correspond to communication channels established between the terminals to the gateway via the satellite. Each inroute layout can consist of a set of return link channels defined with a corresponding symbol rate, modulation type, and/or center frequency for each inroute in the layout. In many satellite communication systems, the IR layout is defined (or setup) once during deployment and remains fixed over the system lifetime. Static preconfigured layouts, however, need to consider changes in system conditions that might occur after deployment. Such conditions can include, for example, changes in atmospheric link conditions such as rain, deployment of different hardware and software platforms, and changes in hardware properties over time. The static IR layout of such systems automatically becomes sub optimal for any change in conditions, because it remains the same and lacks the ability to adapt. This can result in degradation of system performance until optimal conditions return.

BRIEF SUMMARY

An apparatus and method are disclosed for performing dynamic inroute reconfiguration. According to an embodiment, the apparatus includes one or more processors configured to: select a set of factors for use in reconfiguring inroutes in a satellite communication system; define a state representative of inroute layouts based on the set of factors; determine a metric for a current state representative of a current inroute layout; optimize the metric by: performing a state search to identify a new state representative of a new inroute layout, and comparing a metric for the new state to a metric for a current or previous state until a convergence criteria is satisfied; and reconfigure the inroute layouts of the satellite communication system to correspond with the inroute layouts represented by the new state.

According to another embodiment, the method includes: selecting a set of factors for use in reconfiguring inroutes in a satellite communication system; defining a state representative of inroute layouts based on the set of factors; determining a metric for a current state representative of a current inroute layout; optimizing the metric by: performing a state search to identify a new state representative of a new inroute layout, and comparing a metric for the new state to a metric for a current or previous state until a convergence criteria is satisfied; and reconfiguring the inroute layouts of the satellite communication system to correspond with the inroute layouts represented by the new state.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and system for performing dynamic inroute reconfiguration (DIR) are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
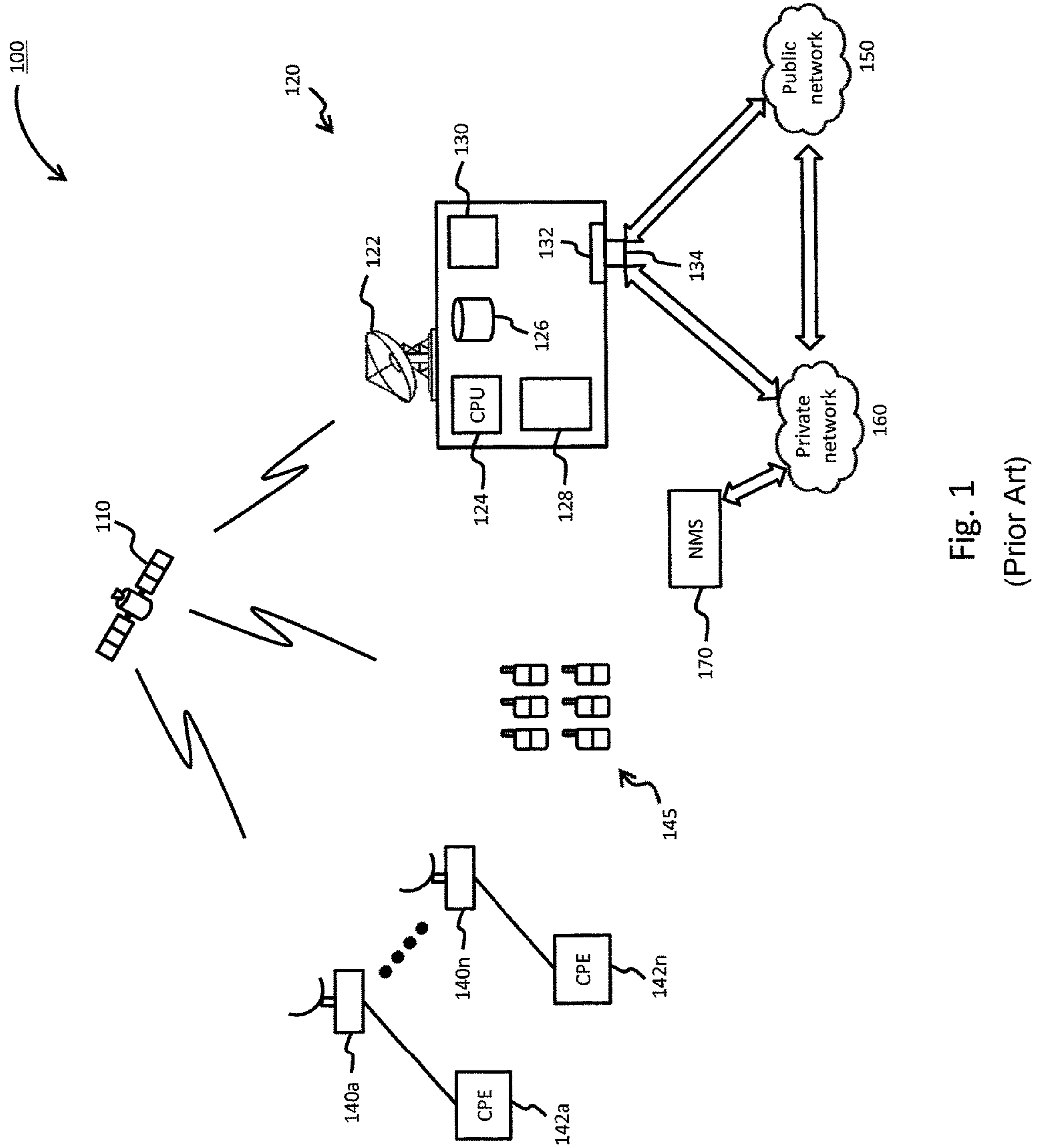
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140*a*-140*n*. Each satellite terminal (or terminal) 140 can be configured for relaying traffic between its customer premise equipment (CPEs) 142*a*-142*n* (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Dynamic Inroute Reconfiguration (DIR)

Figure 2:
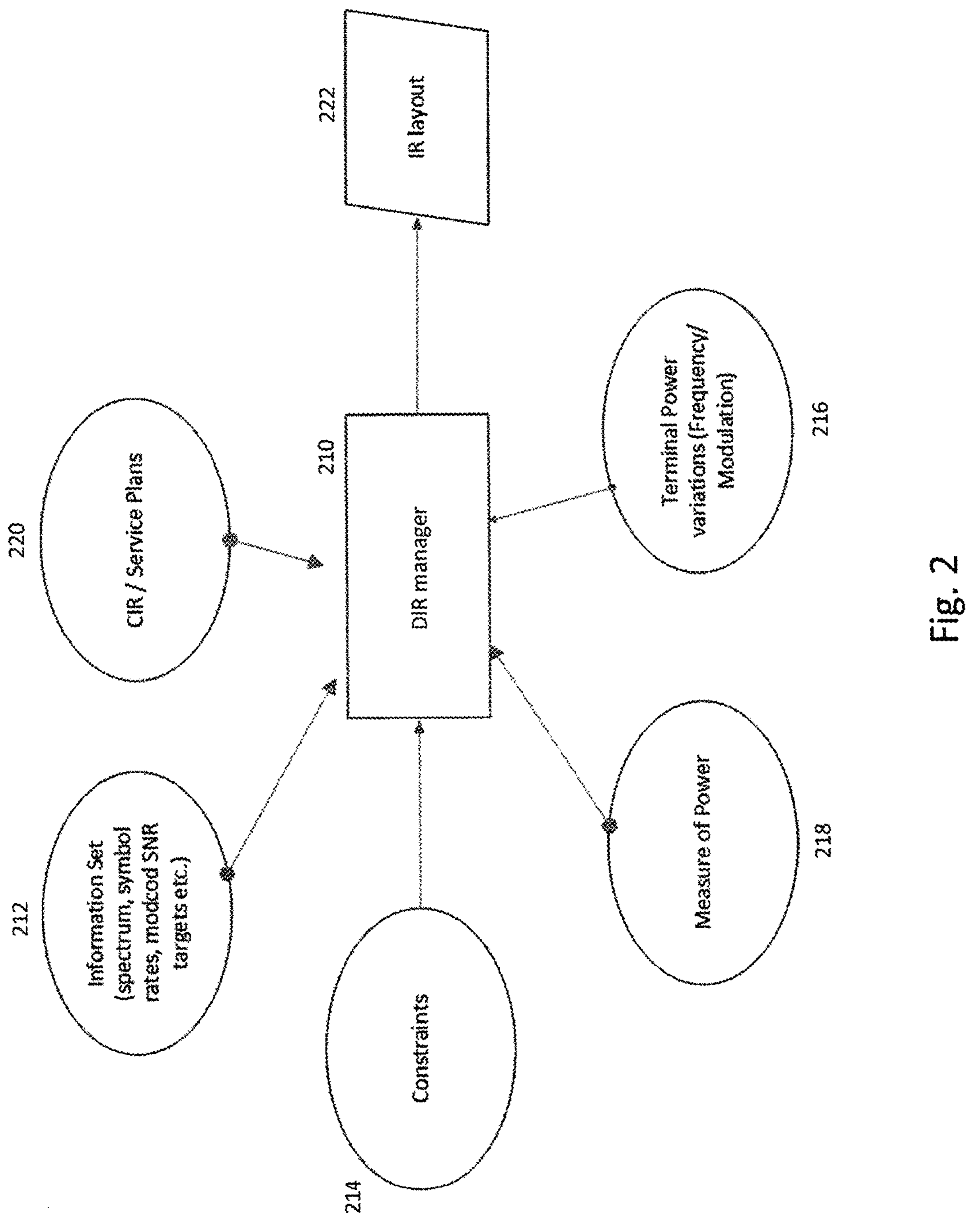
FIG. 2 is a diagram of arrangement for implementing dynamic inroute reconfiguration in the system of FIG. 1, according to one embodiment.

FIG. 2 illustrates an arrangement for implementing dynamic inroute reconfiguration (DIR), according to one or more embodiments. Dynamic inroute reconfiguration is the process of establishing and re-establishing an IR layout in a specific spectrum chunk or chunks. A spectrum chunk, also called as sub-band, is a contiguous portion of frequencies. According to at least one embodiment, the IR layout can consist of a set of symbol rates and center frequency for each of the IR in the layout. Depending on the specific system implementation, the IR layout can also include modulation type, spread factor, etc. According to the disclosed embodiments, the IR layout can be dynamically reconfigured any time there is a change in the system properties that renders the current layout suboptimal, thereby increasing system efficiency. For example, the layout when the terminals operating on the spectrum are in clear sky will be different than when it is raining at the location of the terminal (e.g., terminals 140, 145). This is because the ability of the terminals to operate at the higher symbol rates diminishes with rain as the signal energy gets attenuated.

In typical satellite networks, the gateway (such as gateway 120) serves a certain number of beams, and each beam has a spectrum assigned for transmitting on the IR and a spectrum for transmitting on the outroute (OR). The portion of the spectrum assigned for a beam can change dynamically based on spectrum management rules. Once the bandwidth assignment is done, a layout of different carriers each with different symbol rates is placed depending on the maximum and minimum symbol rates supported by the hardware and the increments in between. The layout determines the Inroute Groups (IGs) or symbol rates deployed, and the number of IRs in each IG. The layout also determines placement of each IR in the frequency. The system performance is dependent on the layout of the IRs.

Static Information Sets

According to one or more embodiments, multiple sets of information 212 can be used to calculate the optimum carrier configuration. Some information sets 212 are constantly changing while others remain static. For example, the spectrum over which a carrier configuration can be found may change in rare instances, whereas the hardware dependent parameters such as the supported SyCoMo (combination of symbol rates, FEC coding rates and modulations) remain fixed over the lifetime of the system or until a hardware overhaul occurs. Some of the parameters that can remain constant include, for example:

1. The set of different symbol rates that the system hardware and software can support. This set is finite and can be specified as a set of numbers Sym={s1,s2,s3, . . . , sn}, or as a range with minimum and maximum values, and a step increment value Sym∈[s1,sn]; inc=(sn−s1)/n.
2. Modulation and coding (MODCOD) SNR performance targets
3. Overhead or efficiency at various layers
4. Overhead from scheduling TDMA traffic
5. Statistical multiplexing gain According to at least one embodiment, the system can also include a set of parameters that is quasi-fixed and changes infrequently. Some of these parameters can include, for example:

1. Bandwidth available: contiguous or non-contiguous spectrum
2. GW to beam mapping
3. Adjacent channel spacing Constraints A set of constraints 214 can also be built into the system. These constraints 214 rarely or never change and act against the optimization or restrict the maximization of capacity and efficiency of the system. These constraints 214 can include, for example:

1. Layout rules in terms of spacing
2. Number of carriers that can be placed
3. minimum number of a certain carrier to be present for availability reasons.
4. minimum number of a certain carrier to be present for throughput reasons Information Gathered From Terminals According to the illustrated embodiment, certain Information is collected from the terminals at periodic or aperiodic intervals because it is constantly changing. For example, information such as atmospheric link conditions or terminal data backlog are gathered by the GW from various sources including the terminals. Terminals can report back different sets of information to the GW. The GW can include a DIR manager 210 which utilizes this information to implement all steps necessary to reconfigure the inroute layouts in real-time. For example, terminal power variations 216 can be reported to represent the radio performance associated with each terminal as well as the transmit parameters (e.g., symbol rate, modulation, coding rates, etc.) that can be supported under current conditions. A measure of power 218, discussed in greater detail below, is also transmitted from each terminal to the GW. Committed information rates (CIR) and service plan information 220 is also supplied to the GW and utilized as input to the algorithm. An optimization process is performed to obtain an inroute layout 222 for each sub-band controlled by the GW. The inroute layout can include different inroutes, symbol rates for each inroute, and the center frequencies for each inroute. Depending on the specific implementation, the DIR manager 210 can be configured as an independent component such as a hardware board within the gateway or stand-alone component interfaced with the gateway. Furthermore, the CPU within the gateway can be configured to implement some or all of the features provided by the DIR manager 210.

Measure of the Power in the System

Figure 3:
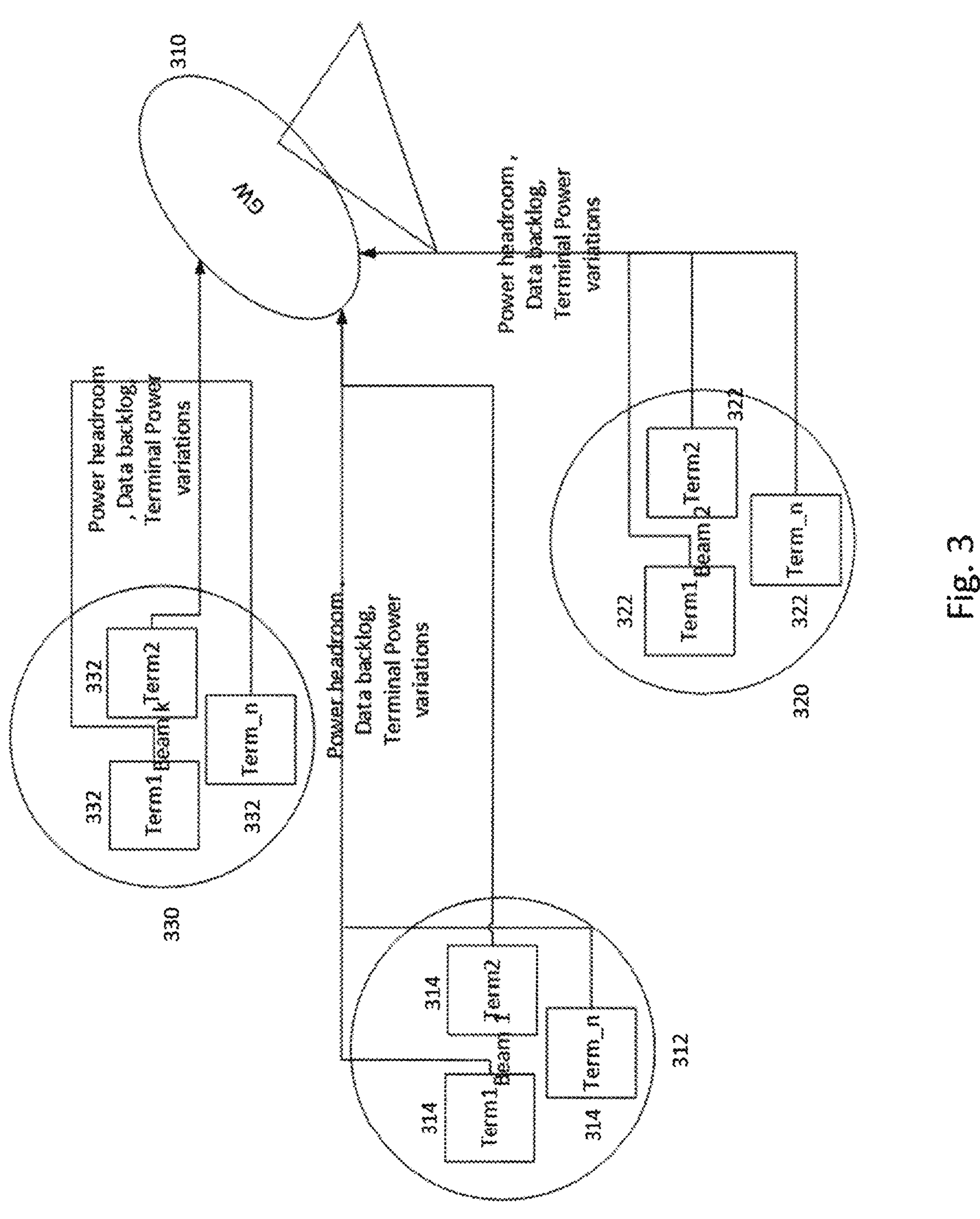
FIG. 3 is a block diagram for illustrating information sent from terminals to the gateway, according to one embodiment.

FIG. 3 is a block diagram illustrating various information sent from terminals 314, 322, 332 to the gateway 310, in accordance with one or more embodiments. Terminal uplink power control maintains the received GW SNR for each MODCOD at the target SNR. This means that the terminal power is set exactly to achieve that SNR. The power back off from maximum transmit power of the terminal is termed power headroom. Due to the different target SNR for each SyCoMo, a different power head room can be available for each terminal. All active terminals 314, 322, 332 transmit the power head room to the GW 310 at the operating SyCoMo. Due to the variation in power across frequency, the power head room for two different IRs at the same MODCOD might be different. The power head room can, therefore, be recorded separately for every frequency bin in the system. The difference in power headroom between MODCODs is usually the difference in the target SNR and the change in nonlinear degradation in the signal. The change in the power head room (in dB) across the frequency bins is the difference in PAF (power variation across frequency) values between those bins. The available spectrum in the inroute is divided into smaller contiguous portions termed as frequency bins.

$$powerHR_{MODCOD_m Sym_S fbin_q} = powerHR_{MODCOD_m Sym_S fbin_p} = (PAF_{fbin_q} - PAF_{fbin_p})$$

The change in the power head room (in dB) between symbol rates can be calculated by:

$$powerHR_{MODCOD_m Sym_T fbin_q} = powerHR_{MODCOD_m Sym_S fbin_q} - 10 * \log10(Sym_T / Sym_S)$$

For each terminal find the Modcod, k, with the highest spectral efficiency that is achievable for each combination of symbol rate and frequency bin in the system from the target SNR values and power headroom values.

$$SNR_{Target} MODCOD_k \leq SNR_{target} MODCOD_m + powerHR_{MODCOD_m Sym_S fbin_p}$$

This allows an average spectral efficiency across all the terminals to be calculated per symbol rate per frequency bin $$SpecEff_{Sym_S fbin_p} = \frac{1}{N} \sum_{i=1}^{N} SpecEff_{MODCOD_k Term_i}$$

TABLE 1

| Average spectral efficiency per frequency bin per symbol rate (SpecTab) | | | |
|---|---|---|---|
| | Fbin 1 | Fbin 2 | . . . Fbin n |
| Symbol rate 1 | SpecEf $f_{Sym_1 fbin_1}$ | SpecEf $f_{Sym_1 fbin_2}$ | . . . SpecEf $f_{Sym_1 fbin_n}$ |
| Symbol rate 2 | SpecEf $f_{Sym_2 fbin_1}$ | SpecEf $f_{Sym_2 fbin_2}$ | . . . . . . |
| . . . | . . . | | |
| Symbol rate m | SpecEf $f_{Sym_m fbin_1}$ | . . . | SpecEf $f_{Sym_m fbin_n}$ |

The power HR also enables the GW 310 to calculate the % of terminals that are able to achieve the most robust MODCOD in a frequency bin at a certain symbol rate. This can be calculated by the following:

$$\text{If } (SNR_{Target} MODCOD_{mostrobust} \leq SNR_{target} MODCOD_m + powerHR_{MODCOD_m Sym_S fbin_p})$$

$$linkclosure = 1 \text{ else } linkclosure = 0;$$

$$Linkclosure\ \%_{Sym_S fbin_f} = \frac{1}{N} \sum_{i=1}^{N} linkclosure_{term_i}$$

TABLE 2

| Link closure percentage per frequency bin per symbol rate (LinkTab) | | | |
|---|---|---|---|
| | Fbin 1 | Fbin 2 | . . . Fbin n |
| Symbol rate 1 | LinkClose%$_{Sym_1 fbin_1}$ | LinkClose%$_{Sym_1 fbin_2}$ | . . . LinkClose%$_{Sym_1 fbin_n}$ |
| Symbol rate 2 | LinkClose%$_{Sym_2 fbin_1}$ | Linkclose%$_{Sym_2 fbin_2}$ | . . . |
| . . . | . . . | | |
| Symbol rate m | LinkClose%$_{Sym_m fbin_1}$ | | LinkClose%$_{Sym_m fbin_n}$ |

CIR and Throughput of a Terminal

The throughput of a terminal is dependent on the maximum possible SyCoMo it can achieve. It might not be efficient for the network to support this SyCoMo since the average efficiency of that symbol rate might be low. Accordingly, this criterion could be counter to the capacity criterion. If a terminal (or terminals) has a particular Committed Information Rate (CIR) or a service plan that is required to be achieved, then the DIR manager can deploy an IR that allows the CIR to be met even if it is not efficient to do that from a system perspective. The CIR for every terminal can, therefore, be considered and used as a constraint under certain embodiments. The required minimum number of IRs at a symbol rate can be calculated based on the number of terminals with a certain CIR requirement.

There can be multiple CIR requirements for different sets of terminals. The minimum symbol rate where the following condition is met can be calculated for every terminal using $$\min_{Sym_i} Sym_i * SpecEff_{Sym_i fbin_k} * (1 - \text{overhead}) > CIR_p$$

where overhead is the total overhead % in both the PHY and layer 2

The proportion of terminals for each of those symbol rates and frequency bins is calculated and recorded in a table called CIRTab, with each CIR having a separate CIRTab $$Term\,\%_{Sym_i Fbin_k} = \frac{NumberTerminals_{Sym_i Fbin_k}}{\text{Total Number of terminals for } CIR}$$

TABLE 3

| CIRTab | | | |
|---|---|---|---|
| For CIR 1 | Fbin 1 | Fbin 2 | . . . Fbin n |
| Sym 1 | Term$\%_{Sym_1 Fbin_1}$ | Term$\%_{Sym_1 Fbin_2}$ | . . . Term$\%_{Sym_1 Fbin_n}$ |
| Sym 2 | Term$\%_{Sym_2 Fbin_1}$ | Term$\%_{Sym_2 Fbin_2}$ | . . . |
| . . . | . . . | | |
| Sym m | Term$\%_{Sym_m Fbin_1}$ | Term$\%_{Sym_m Fbin_2}$ | |

For example, consider a terminal which requires 3 Mbps of CIR. If the efficiency of an IR is 70% and the maximum ModCod operable is 16APSK 2/3 at 2 Msps, and 16APSK 9/10 at 1M then the minimum symbol rate required is 2 Msps. If 10% of the terminals require a 2 Msps IRs, then the IR layout will have to meet that requirement. A higher symbol rate IR can also be used instead to achieve the purpose. Multiple sets of CIR will be present in a system and the maximum SyCoMo achievable for the terminals will also vary. The minimum number required for a certain symbol rate will need to be calculated per CIR.

Terminal Power Variation Across Frequency

Each terminal's output power varies as a function of frequency. The variation is typically small across a small chunk of spectrum (<25 MHz) but can reach up to 4-5 dB across a larger chunk of spectrum (~500 MHz). This is a result of the variation in performance of the radio components across the spectrum. Each terminal has a unique variation, which can sometimes diminish its ability to operate at the same SyCoMo across the spectrum. According to at least one embodiment, the DIR manager can counter this effect by configuring and/or instructing the terminals to send the transmit power at each frequency bin to the gateway.

The terminal has a measure of the transmit power variation (PVF) at a set of equispaced frequency points. This set of points is measured during factory calibration and recorded in the radio. It is measured and recorded in dBm. For example, [−29, −30, −28.5, −32, −30.25]. Since only the relative power is required, this set will be normalized to minimum value to obtain a set of positive numbers. In this example it will be [3, 2, 3.5, 0, 1.75]. This set shall be communicated to the GW and then used to calculate the power variation (PVF) at each of the frequency bins. If there are multiple PVF points in a frequency bin, then the average of those values can be attributed to the frequency bin.

$$PVF_{fbin_k} = \sum_{i=1}^{p} PVF_{fi};\ f_i \in fbin_k$$

Otherwise, the PVF value for the frequency nearest to the frequency bin center frequency can be used $$PVF_{fbin_k} = PVF_{f_i};\ f_i \text{ is nearest to } fbin_k \text{ center}$$

The GW can be configured to use this variation to augment the previous power headroom equation to obtain the equation:

$$powerHR_{MODCOD_m Sym_S fbin_q} = powerHR_{MODCOD_m Sym_S fbin_p} - \left(PAF_{fbin_q} - PAF_{fbin_p}\right) - \left(PVF_{fbin_q} - PVF_{fbin_p}\right)$$

The DIR manager can also deploy IRs with higher symbol rates for a short duration to enable servicing data backlogs that may be present in certain terminals. For example, the DIR manager can instantaneously increase individual throughput of a particular terminal by allowing it to operate at the highest SyCoMo possible. This allows the DIR manager to effectively service the terminal's backlog within a short time frame. The highest SyCoMo possible for a certain terminal is available as part of the SpecTab calculation. The backlog is represented as bytes in each of the different queues belonging to different classes of service.

At System Startup

During system deployment, no terminals are present in the system. This implies that none of the information previously discussed can be gathered. Since the algorithm depends on this data as input, link budgets and other pre-calculated information might be used to seed the tables SpecTab, LinkTab and CIRTab.

Various optimization techniques can be used for finding an optimal layout. According to an embodiment, a rule-based approach can be implemented using a set of fixed rules to generate a layout plan. According to another embodiment, an optimization solver can be implemented using simulated annealing that optimizes a weighted metric consisting of multiple factors including capacity, throughput, link availability etc.

Optimization Algorithm

Configuration of the inroute layout typically depends on multiple factors such as clear sky capacity, link availability, traffic BW management, service agreements, etc. According to an embodiment, a weighted metric approach can be utilized, wherein each of the factors involved is associated with a dynamic set of weights that change with requirements and link conditions. The combined metric of the weighted parameters can be maximized using optimization techniques such as gradient descent, simulated annealing, etc. For example, the combined metric could be a weighted sum of factors such as:

$$\text{Metric}(t) = \sum_{i}^{N} \text{weight}_i(t) * \text{factor}_i(t)$$

$$\text{factor}_i(t) = f(IRLayout)$$

All factors will be affected by the IR configuration. Since factors such as capacity will compete with others like maximum throughput for an individual terminal or the link availability for a terminal, maximizing the combined metric will always result in the best possible solution for the entire system. The search space for the optimization procedure can be all possible IR layout configurations, or there can be certain restrictions placed that will narrow the search space down. The restrictions on spacing, roll off, allowable symbol rates, etc. will always be present.

TABLE 4

| Weighted metric DIR approach | | |
|---|---|---|
| Factor | Description | Weight |
| Total IR capacity | This will depend on how efficient the spectrum can be run. | [0-1] |
| Highest throughput for a terminal | The system needs to achieve a balance between the throughput for a particular terminal and the total IR capacity | [0-1] |
| Link Availability | To maintain a higher link availability certain lower symbol rates, must be deployed. | [0-1] |
| Terminal Backlog | If a terminal's backlog becomes high a dedicated higher throughput IR can be deployed to clear it quickly | [0-1] |

IR capacity is a function of the bandwidth available and the spectral efficiency achieved in that bandwidth. It is also a function of the overhead incurred at different TCP/IP layers. One of the multiple methods of calculating IR capacity is with the following formula.

$$IR\ \text{capacity} = \sum_{i=1}^{P} \left(SymRate_{IR_t} * SpecTab\left(SymRate_{IR_i}, fbin_{IR_i}\right)\right);$$

$$SymRate_{IR_i} \text{ is the symbol rate of the } ith\ IR$$

$$SpecTab\left(SymRate_{IR_i}, fbin_{IR_i}\right) \text{ is the } SpecTab \text{ value for } IR_i$$

Link availability factor can be calculated from the LinkTab. Link availability shows the percentage of terminals able to achieve the most robust MODCOD present.

$$\text{Link availability} = \frac{1}{p} \sum_{i=1}^{P} LinkTab\left(SymRate_{IR_i}, fbin_{IR_i}\right)$$

The constraints of the system will be applied as well on the algorithm to form a constrained optimization problem.

Generic Optimization

Figure 4:
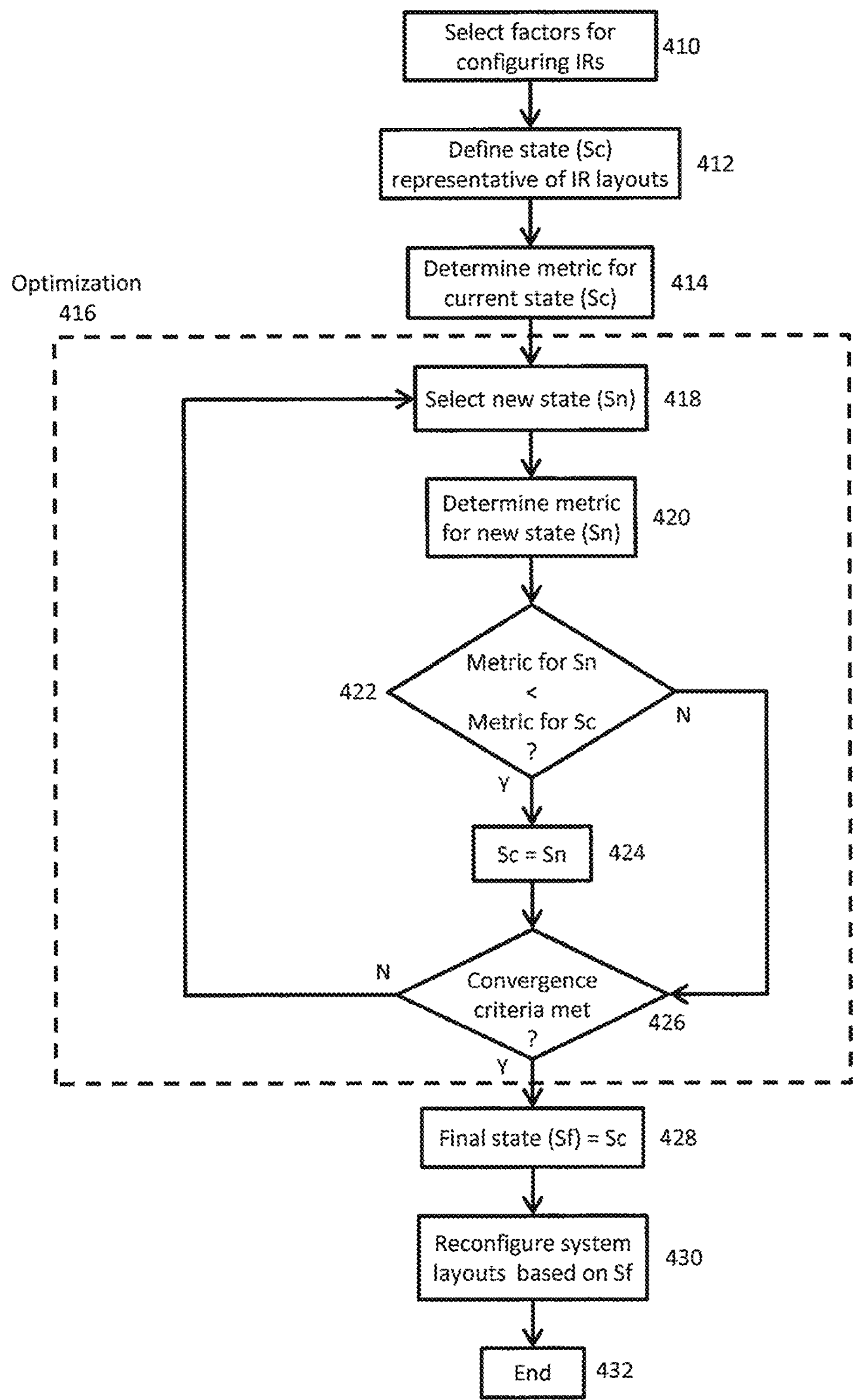
FIG. 4 is a flowchart of a process for dynamic inroute reconfiguration, in accordance with one or more embodiments.

FIG. 4 is a flowchart of a process for dynamic inroute reconfiguration, in accordance with one or more embodiments. At 410, a set of factors is selected for configuring inroutes in the system. According to at least one embodiment, the set of factors can correspond to different performance criteria, such as capacity, throughput, link availability, etc. Furthermore, the factors can be weighted depending on priority desired by the system operator. At 412, a state is defined to represent the layout of inroutes in the system. The state can be defined, for example, based on the set of factors that were previously selected. At 414, a metric is determined for the current state Sc which represents the current inroute layout for the system. According to one or more embodiments, the metric can correspond to a value reflective of the manner in which the selected factors affect the inroute layout for the system.

At 416, an optimization process is performed to optimize the metric and obtain the inroute layout which best satisfies the selected factors. According to one or more embodiments, this can be accomplished by first performing a state search across the system inroute space, at 418, in order to identify a new state Sn. At 420, a metric is determined for the new state. At 422, the metric for the new state is compared to the metric for the current state. If the metric for the new state is less than the metric for the current state, then control passes to 424. The lower metric, for example, can be representative of convergence for the optimization process. If the metric for the new state is greater than the metric for the current state, however, control would pass to 426. At 424, the current state Sc is assigned the value of the new state Sn. At 426, it is determined whether the convergence criteria has been met. According to an embodiment, the convergence criteria can be a predetermined value set by the system operator. It should be noted, however, that any type of appropriate convergence criteria can be utilized. If the convergence factor is not satisfied, then control returns to 418 where a new state Sn is selected.

If the convergence criteria has been satisfied, then control passes to 428. The final state Sf is assigned the value of the current state Sc. At 430, the inroute layout of the satellite communication system is reconfigured. More particularly, the inroute layout represented by the new state is applied to the satellite communication system for subsequent operations. The process ends at 432.

Simulated Annealing Based Optimization

Simulated annealing provides an efficient global optimization mechanism for discrete states and with a large search space. According to an embodiment, the method models the physical process of heating metal or glass and slowly cooling it to remove defects. The method employs stochastic sampling of the states and a decreasing accepting probability of worse solutions as the temperature of the system lowers.

State Definition

The state definition of the IR layout determines the search space, the constraints associated with the state, and the method of calculating the energy of the system. In the next sections, different state definitions are presented along with the algorithm and simulation results for each.

State Search

In order arrive at a next state for evaluation, the space can be searched randomly. Depending on the state definition and the constraints associated with the state, the space can be very large. In algorithm, 3 presented below, a heuristic is employed to allow a better search by using a concept of a neighbor state. The neighbor state is defined as the state whose energy differs from the current state by a minimum value.

Constraints

The constraints of the system impact the valid states in the space. Accordingly, the state search can consider the constraints to reduce the search space by checking only the states that are valid. The number of channels supported by the system is a common constraint arising from the hardware. The link closure of every terminal can be added as another constraint.

State Energy

The state energy (En) is the weighted metric (Metric (t)) defined above. According to an embodiment, the optimization process will find the state with the lowest energy. In this algorithm's definition, since the energy is the same as the metric which is to be maximized, the highest energy state can also be found by the optimization algorithm Annealing Schedule The annealing schedule is the process followed to reduce the temperature of the system. This could be a simple linear decrease as the simulation progresses or exponential. For ease of use, the temperature value typically ranges between [0, 1] with a higher value denoting a hotter system.

$$\text{Temperature} = 1 - \frac{\text{Iteration}_{current}}{\text{Iteration}_{Total}};\ \text{Iteration}_{current} \text{ increments by } 1$$

Acceptance Probability

The acceptance probability (Ap) function determines the probability of accepting a new state as the current state. The function is dependent on temperature of the system allowing worse states to be accepted with a higher probability when the system is hotter and reducing that probability as the system cools down. The acceptance probability function can be augmented with a threshold function where every state that has a lower energy is always accepted.

$$\text{if } (Sc) > (Sn),\ Ap = 1$$

$$\text{else}$$

$$Ap = \exp((En(Sn) - En(Sc)) / Temp)$$

En(Sc) is energy of current state, Sc and

En(Sn) is the energy of the next state, Sn

Although the algorithm normally works to reduce or minimize the energy of the states, it can also be configured to maximize the energy, especially if the energy which is the same as the cost function is directly proportional to the IR capacity or individual throughput or link availability all of which need to be maximized in any given system. The signs of the formulas presented above in that case will be reversed.

$$\text{if } (Sc) < EN(Sn),\ Ap = 1$$

$$\text{else}$$

$$Ap = \exp((En(Sn) - En(Sc)) / Temp)$$

Figure 5:
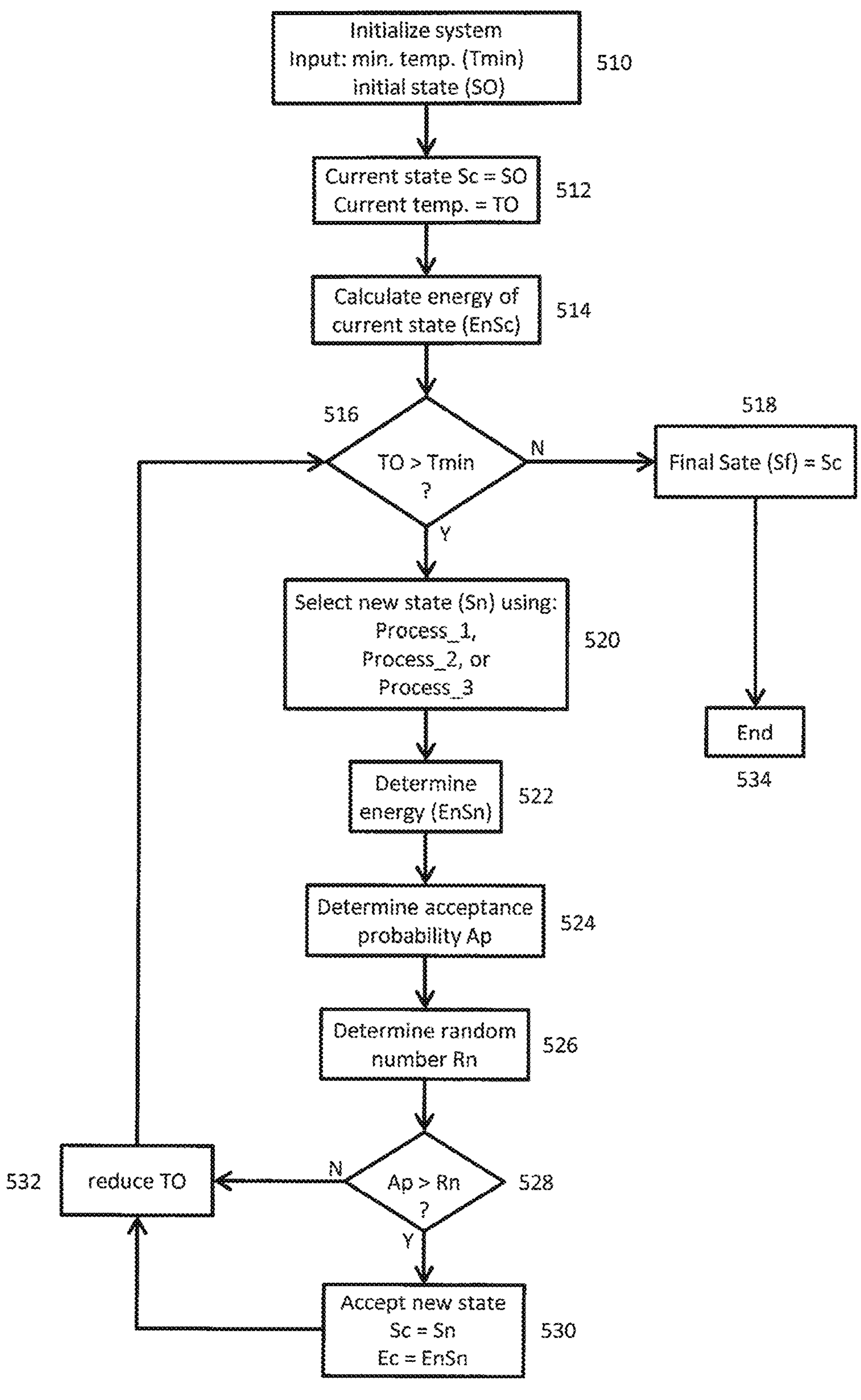
FIG. 5 is a flowchart of a process for dynamic inroute reconfiguration using simulated annealing, in accordance with additional embodiments.

FIG. 5 is a flowchart of a process for dynamic inroute reconfiguration using simulated annealing, in accordance with additional embodiments. At 510, the system is initialized. As previously discussed, this can involve the use of information sets and constraints that will be applied during the optimization process. In addition, a minimum temperature is input as well as the values for an initial state. At 512, the current state is assigned the value of the initial state. Furthermore, an initial value is assigned to the current temperature. At 514, the energy for the current state is determined. According to the illustrated embodiment, the energy can be in the form of a weighted metric which is based on various system parameters that require optimization.

At 516, the current temperature is compared to the minimum temperature previously set. If the current temperature is less than the minimum temperature, the final state is assigned the value of the current state at 518. If the current temperature is greater than the minimum temperature, however, then a new state is selected. The new state can be selected, for example, using any one of the 3 states selection processes (or algorithms) described herein. At 522, the energy of the new state is determined. At 524, an acceptance probability is determined. According to at least one embodiment, the acceptance probability is a function which determines the probability of accepting a new state as the current state. The function is dependent on temperature of the system. Furthermore, the acceptance probability function can be augmented with threshold functions.

At 526, a random number is determined. According to an embodiment, the random number can be a uniform random number which ranges from 0 to 1. At 528, the acceptance probability is compared to the random number. If the acceptance probability is greater than the random number, the new state is accepted at 530. Control then passes to 532 where the current temperature is reduced. Similarly, if the acceptance probability is less than the random number, the temperature is reduced. Thus, regardless of the result of the comparison at 528, the temperature will be reduced. Various techniques can be used to reduce the temperature in addition to those previously described. Control then returns the 516. The current temperature (which has just been reduced) is compared to the minimum temperature. If the current temperature is less than the minimum temperature, then the current state is assigned to the final state. The process ends at 534.

Using different state definitions and state searches result in different ways of optimizing the layout. Changing the cost metric or state energy definition leads to a different result even if the state search method remains the same. The acceptance probability and annealing schedule also affect the optimization process and can be modified. Different versions of the algorithm are presented in the next sections that illustrate how these factors affect the optimization process. The annealing schedule and acceptance probability are kept the same across the different algorithms and the other factors are varied. The algorithm complexity increases with the version by introducing more optimization factors and constraints and additional heuristics in the state search.

Algorithm Version 1

If it is assumed that there is no power across frequency (PAF) variation in the system, and therefore the placement of the carriers does not matter, the state can be defined as a set of unique IGs and the number of IRs in each IG.

$$\text{state} = \{[IG_1, IG_2, \ldots, IG_n], [p_{IG1}, p_{IG2}, \ldots, p_{G_n}]\}$$

$IG_k$ is the kth unique Inroute Group with symbol rate, $Sym_k$ $Sym_k \in [Sym_1, Sym_2, \ldots, Sym_n]$; the set of symbol rates on which the system can operate $p_{IG_k}$ is the integer number of IRs in $IG_k$ Keeping the IGs fixed as the whole set of IGs available in the system and varying the number of IRs from 0 upwards allows an exhaustive state search to occur. The states can be chosen, for example, by picking a random number of IRs in each IG. Hence, the state definition can be simplified to $$\text{state} = \{[p_{IG1}, p_{IG_2}, \ldots, p_{IG_n}]\}$$

Once a state is chosen, it is checked to see if the constraints are satisfied. If the constraints are not met, then the chosen state is invalid, and the state search is repeated. According to one or more embodiments, in order to reduce the state space, some of these constraints can be considered while choosing the state itself. For example, the bandwidth of the spectrum (BW) for the layout is fixed and cannot be exceeded. This implies that the number of IRs in any one IG cannot exceed $$\left\lfloor \frac{BW}{SymRate_{IG} * CarrierSpacing} \right\rfloor$$

$$\text{where } OB_{IR_{IG_k}} = SymRate_{IG_k} * CarrierSpacing$$

is the occupied bandwidth of 1 IR in $IG_k$. The random number of IRs in $IG_k$ can be chosen from the range $$\left[0, \left\lfloor \frac{BW}{SymRate_{IG_k} * CarrierSpacing} \right\rfloor\right].$$

Another constraint that can be used is to keep the total number of IRs that can be supported by the hardware (Nc) at a fixed value. The total number of IRs in the layout must be equal or less than this number.

The metric weights can be defined as '1' for the capacity and '0' for others. This results in maximizing the efficiency of the system. The CIR requirements need not be calculated. Without any PAF variation, the SpecTab and LinkTab also collapse into a 1D table. The layout of the IRs on the IGs can be achieved by placing all IRs in one IG, starting with the highest symbol rate IG and then moving to another IG. The placement can be done by starting with the lowest frequency and following the spacing rule. The centers spacing between two consecutive IRs belonging to $IG_k$ and $IG_{k+1}$, is calculated as $$\frac{OB_{IR_{IG_k}} + OB_{IR_{IG_{k+1}}}}{2}$$

which is the minimum spacing between the two IRs.

Figure 6:
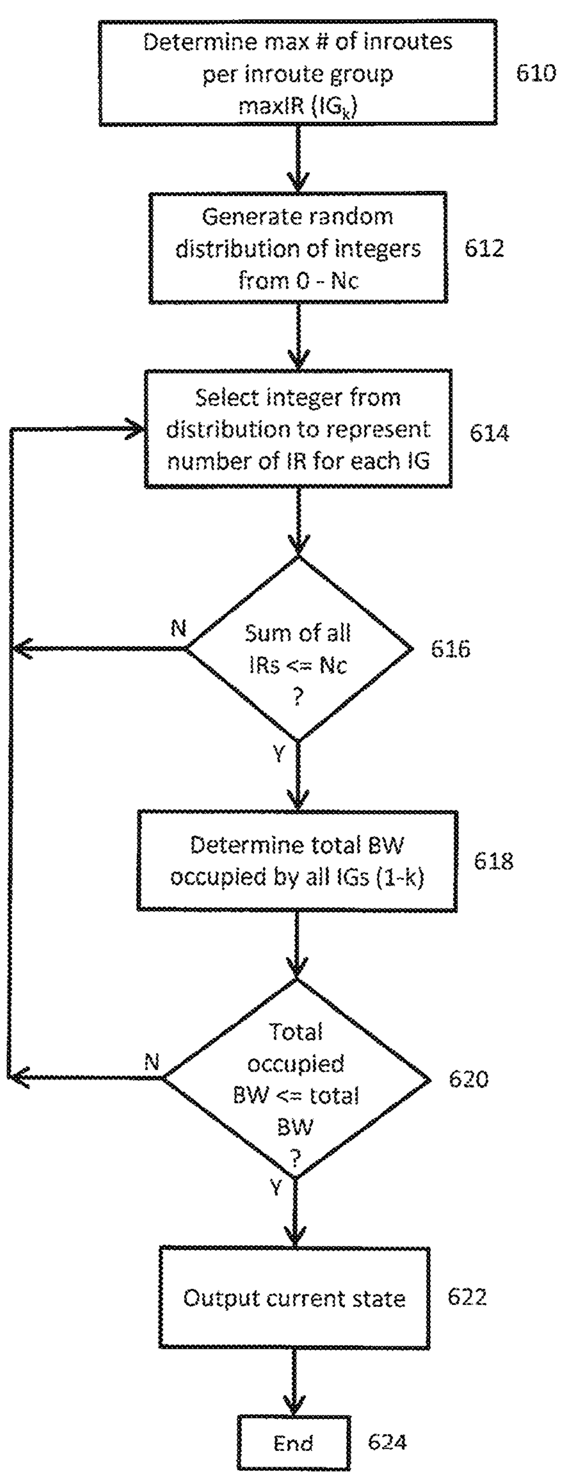
FIG. 6 is a flowchart of a process for finding new states, according to one embodiment.

FIG. 6 is a flowchart of a process for finding new states, in accordance with one embodiment. At 610, the maximum number of inroutes per inroute group in the system is determined. At 612, a random distribution of integers is generated. According to the illustrated embodiment, the distribution can range from zero to the maximum number of carriers supported by the system. At 614, an integer is selected from the distribution to represent the number of inroutes for each inroute group. At 616, it is determined whether the sum of all inroutes is less than or equal to the maximum number of carriers supported by the system. If the sum of all and inroutes is not less than the maximum number of carriers, then control returns to 614, where new values are selected to represent the number of inroutes for each inroute group. If the sum of all inroutes is less than or equal to the maximum number of carriers, then the total bandwidth occupied by all the inroute groups is determined at 618. For example, if the number of inroute groups ranges from 1-k, then the total bandwidth is based on the number of inroutes in each of the k inroute groups.

At 620, it is determined whether the total bandwidth occupied by the current set of inroutes is less than or equal to the total bandwidth supported by the system. If the total occupied bandwidth (OB) is greater than the total system bandwidth, then control returns to 614. If the total occupied bandwidth satisfies the criteria of being less than or equal to the total bandwidth in the system, control passes to 622. At 622, the system outputs the current state. According to the illustrated embodiment, this can be in the form of a plurality of integers corresponding to the number of inroutes in each inroute group. Alternatively, the current state can be output as a table listing each inroute group and the corresponding number of inroutes contained therein. The process ends at 624.

Algorithm Version 2

According to an embodiment, algorithm version 1 can be extended by considering PAF variation and adopting a state definition that incorporates the center frequencies of the IRs themselves. This allows the position of the IRs to be optimized as well, instead of optimizing the IGs and the number of IRs alone.

$$\text{state} = \{[Sym_{IR_1}, Sym_{IR_2}, \ldots, Sym_{IR_n}], [fc_{IR_1}, fc_{IR_2}, \ldots, fc_{IR_n}]\}$$

Each IR in the state can be defined by the symbol rate of the IR and the center frequency of the IR. Accordingly, the new state selection includes choosing an IR set with random symbol rates, and a random center frequency set. The total bandwidth of the spectrum is the same, and the sum of the occupied bandwidth of all the IRs should be less than equal to the bandwidth of the spectrum. The state energy remains the same as that of version 1. Two additional constraints are introduced, the maximum number of carriers supported by the system, Nc, and the requirement for at least one IR where a terminal can close link.

The state selection uses the constraints to minimize the search space.

$$n \le Nc \text{ and } \sum_{i=1}^{n} OB_{IR_i} \le BW$$

$$OB_{IR_i} = Sym_{IR_i} * CarrierSpacing$$

The number of carriers can be chosen at random from a uniform distribution of [0, Nc]. The range is shrunk as the temperature of the simulation reduces. The mean of the distribution is kept as the current state's number of carriers, and the deviation around it is reduced. This allows the simulation to choose states whose energy is closer to the current state's energy as the temperature cools.

Once the IR set of symbol rates is chosen, the center frequencies for each IR are chosen. The BW available can be assumed to be between frequencies fl and fh. Keeping the selection simple, the center frequencies are chosen from lowest to highest in order such that $$f_l < fc_{IR_1} < fc_{IR_2} <, \ldots, < fc_{IR_n} < f_h$$

where $fc_{IR_1}$ is the center frequency of $IR_1$ and $BW = f_h - f_l$

The center frequencies must abide by the channel spacing rules that can be formulated as $$fc_{IR_i} + \frac{OB_{IR_i}}{2} < fc_{IR_{i+1}} - \frac{OB_{IR_{i+1}}}{2}$$

and the fact that all the occupied bandwidth needs to be within the bandwidth. This implies that $$fc_{IR_1} - \frac{OB_{iR_i}}{2} \geq f_l$$

and $$fc_{IR_n} + \frac{OB_{IR_n}}{2} \leq f_h$$

Figure 7:
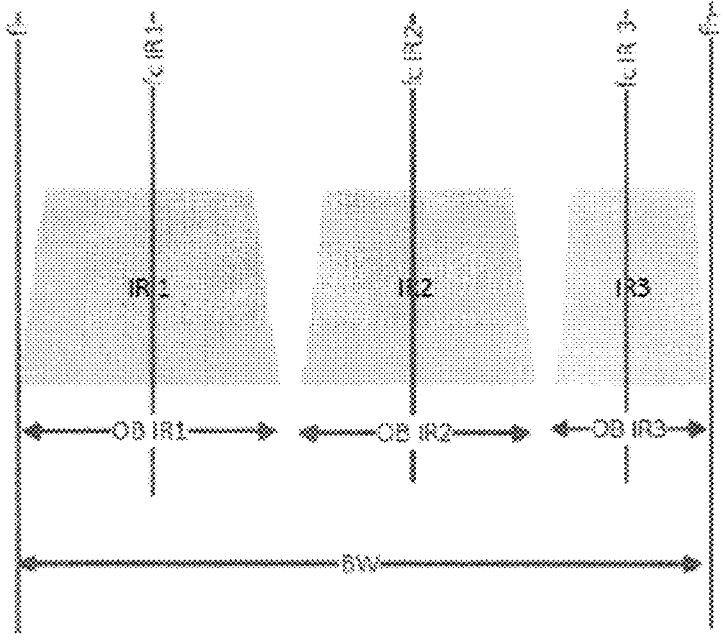
FIG. 7 is a diagram illustrating the results of an inroute placement algorithm, according to one embodiment.

FIG. 7 illustrates these rules using 3 IRs.

While choosing the center frequency of a certain $IR_{p+1}$, $fc_{IR_{p+1}}$, a random number is chosen with a uniform distribution from the range of frequencies that lie between $fcmin_{IR_{p+1}}$ and $fcmax_{IR_{p+1}}$ $$fc_{IR_{p+1}} \in [fcmin_{IR_{p+1}}, fcmax_{IR_{p+1}}]$$

$$fcmin_{IR_{p+1}} = \left(fc_{IR_p} + \frac{(OB_{IR_p} + OB_{IR_{p+1}})}{2}\right);$$

$$\text{for } p = 0, fcmin_{IR_1} = f_l + \frac{OB_{IR_1}}{2} \text{ and } f_l = fc_{IR_0} + \frac{OB_{IR_0}}{2}$$

$$fcmax_{IR_{p+1}} = fcmin_{IR_{p+1}} + \left(f_h - \left(fc_{IR_p} + \frac{OB_{IR_p}}{2}\right)\right) - \sum_{i=p+1}^{n} (OB_{IR_i})$$

Once both the IR symbol rates and center frequencies have been chosen, a new state definition has been reached. The new state definition can be supplied, for example, to the simulated annealing algorithm (or other optimization algorithm) in order to proceed with minimizing the state energy. As previously discussed, this can be accomplished by checking for the energy of the new state and comparing with the current state's energy.

Algorithm Version 3

The algorithm of version 2 considers most constraints and system properties described in the earlier subsections. The state definition allows for those properties to be optimized appropriately. The state selection algorithm, however, allows a wide variety of combinations to be chosen making the search space very large and the algorithm convergence slow. According to an embodiment, algorithm version 3 can be used to search the space (or graph) by generating a 'neighbor' vertex/state. This causes the state generation to be slowly skewed towards the neighbors of the current state.

A neighboring vertex or state is defined as the state that has the minimum energy difference with the current state. Since the energy of the state is a function of the number and value of the elements in the state, the neighboring states will be the ones with a change in a minimum number of those elements. Since our state is defined as $$\text{state} = \{[Sym_{IR_1}, Sym_{IR_2}, \ldots, Sym_{IR_n}], [fc_{IR_1}, fc_{IR_2}, \ldots, fc_{IR_n}]\},$$

the neighboring states can be defined as the ones with a modification in any one element of the state. This modification could be in the symbol rate or in the center frequency of one of the IRs or in the absence or addition of an element. The next neighbor state can be found by performing one of the following operations on the current state 1. Adding an IR $$state_{new} = \{[Sym_{IR_1}, Sym_{IR_2}, \ldots, Sym_{IR_{n+1}}], [fc_{IR_1}, fc_{IR_2}, \ldots, fc_{IR_{n+1}}]\}$$

2. Subtracting an IR $$state_{new} = \{[Sym_{IR_1}, Sym_{IR_2}, \ldots, Sym_{IR_{n-1}}], [fc_{IR_1}, fc_{IR_2}, \ldots, fc_{IR_{n-1}}]\}$$

3. Modifying one IR's symbol rate

4. Modifying one IR's center frequency

The search starts with up to Oper_max singular operations and progresses towards only 1 such operation as the system cools. This allows the search space to continuously narrow down and find the optimal solution in a smaller space as the search goes on. Generally, this heuristic of picking neighbors of the current state works well in many applications and works well here as well.

Figure 8:
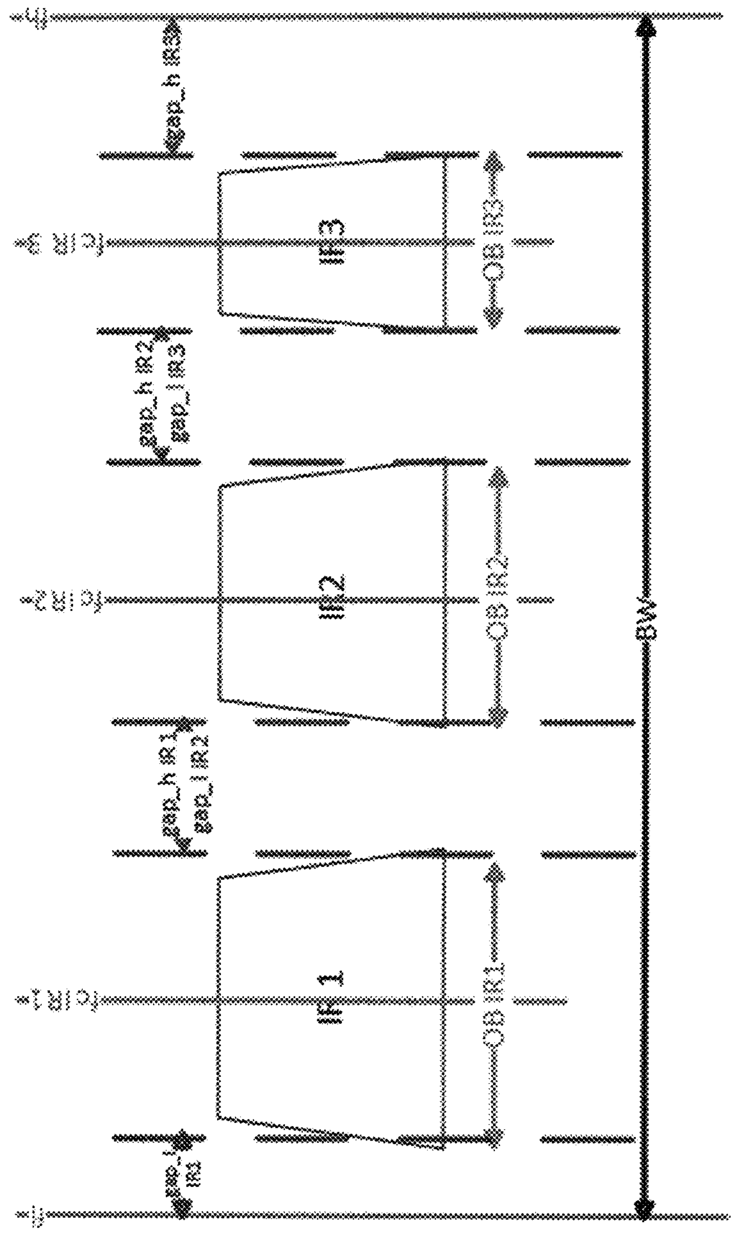
FIG. 8 is a diagram of an inroute layout showing gaps between inroutes, according to one embodiment.

FIG. 8 illustrates an IR layout and gaps between IRs. The IRs have a certain occupied bandwidth and a center frequency. The spectrum between the occupied bandwidth of 2 adjacent IRs is called a 'gap'. Each IR has 2 gaps, one on the lower frequency side and one on the higher frequency side. These are denoted by 'gap_l' and 'gap_h' in FIG. 8. To minimize the spectrum wastage, gaps should be zero. To this end, extra IRs can be added in a gap, or the existing IRs changed in symbol rate and center frequency to cover the gaps.

$$gapl_{IR_{i+1}} = gaph_{IR_i} = \left(fc_{IR_{i+1}} - \frac{OB_{IR_{i+1}}}{2}\right) - \left(fc_{IR_i} + \frac{OB_{IR_i}}{2}\right);$$

$$\text{for } i = 0, gapl_{IR_1} = \left(fc_{IR_1} - \frac{OB_{IR_1}}{2}\right) - f_l$$

$$\text{for } i = n, gaph_{IR_n} = f_h - \left(fc_{IR_n} + \frac{OB_{IR_n}}{2}\right)$$

Adding an IR

To add an IR in to the current layout, the following steps need to be performed.

1. Find gaps where at least the smallest IR can be placed (occupied BW of the smallest IR is smaller)

2. Pick a random gap from step 1

3. Check the IR symbol rates that can be placed in that gap from step 2

4. Pick a certain symbol rate at random from the set from step 3

5. Pick the center frequency of the IR randomly following the spacing rules from algorithm version 2

Deleting an IR

Pick a random IR out of the existing ones and remove that element (symbol rate and center frequency) from the state.

Modifying One IR's Symbol Rate

1. Pick a random IR from the existing layout

2. Check what symbol rate IR can fit in that center frequency

3. Pick a random IR symbol rate other than the current from the ones that can fit 4. change the symbol rate to the new one Modifying One IR's Center Frequency 1. Pick a random IR from the current layout 2. Calculate the gap around the IR. If no gaps, then pick another IR 3. Pick whether the shift is towards higher or lower frequencies.

4. Pick a random amount to move from the gap available on that side

5. Move the center frequency by the random amount

Figure 9:
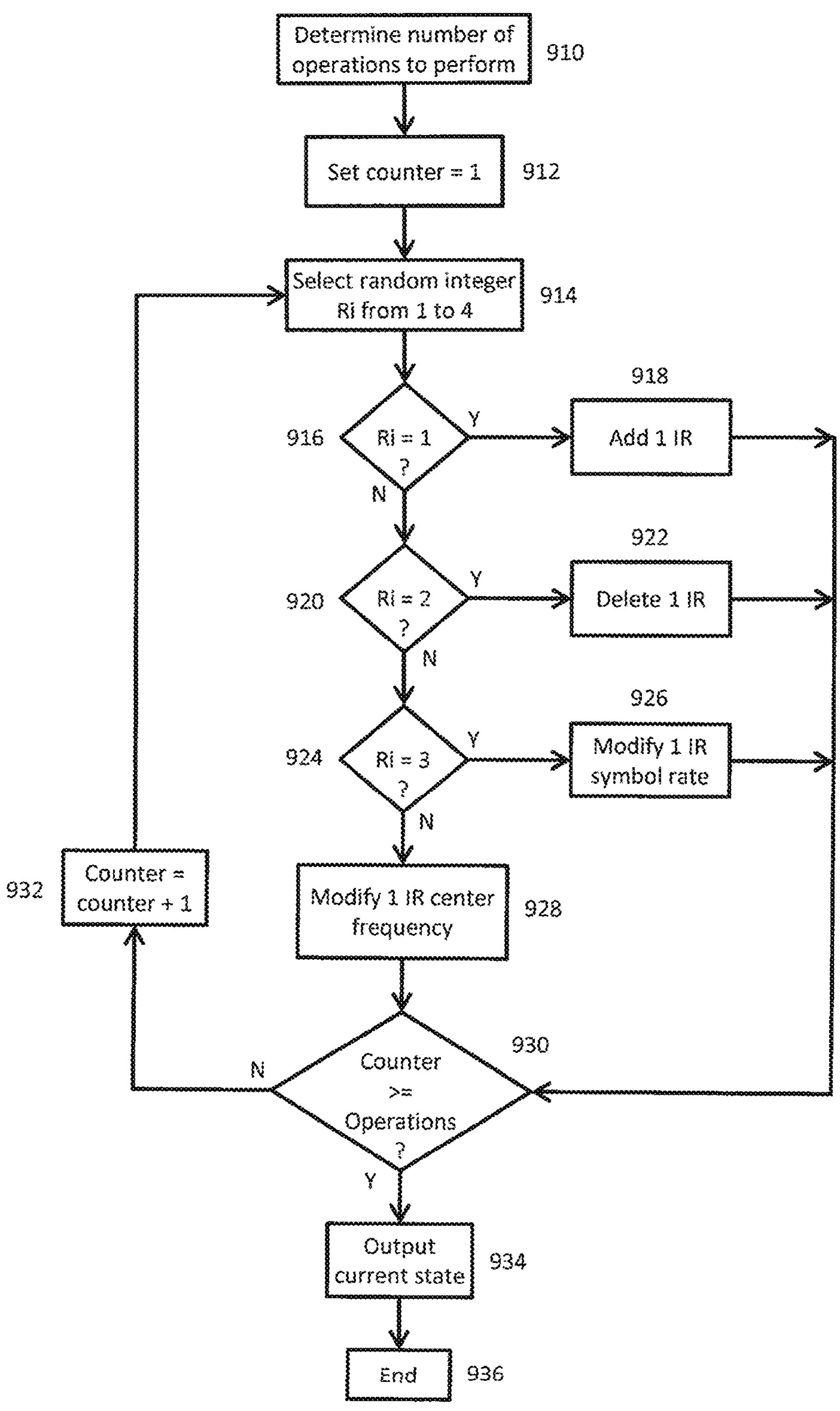
FIG. 9 is a flowchart of a process for selecting a neighboring state, according to one embodiment.

FIG. 9 is a flowchart of a process for selecting a neighbor state, in accordance with an embodiment. At 910, the number of operations that will be performed to select the current state is determined. According to at least one embodiment, the number of operations can correspond to a factor of the current temperature. This can be selected such that the number of operations can be higher when the system temperature is hot, and lower as the system cools. At 912, a counter is initialized. At 914, a random integer is selected. According to the illustrated embodiment, the random integer is selected from the set of integers ranging from 1-4. At 916, it is determined whether the value of the random number is 1. If the random number is equal to 1, control passes to 918. One inroute is added to the current inroute layout. Control then proceeds to hit 930. If the random number is not equal to one, control passes to 920.

At 920, it is determined if the random number is equal to 2. If the random number is equal to 2, then control passes to 922 where one inroute is deleted. Control then proceeds to 930. If the random number does not equal 2, control passes to 924 where the value of the random number is again examined. If the random number is equal to 3, control passes to 926 where one inroute symbol rate is modified. Control then proceeds to 930. If the random number is not equal to 3, then one inroute center frequency is modified at 928. At 930, it is determined whether the value of the counter is greater than or equal to the number of operations. If the counter is not greater than the number of operations, control passes to 932. The counter is then incremented, and control returns to 914. If the counter is greater than or equal to the number of operations, then the current state is output at 934. The process ends at 936.

Simulation

Each of the disclosed algorithms was simulated to compare performance of the optimization being performed. The simulation parameters chosen for the different versions were kept the same and are shown in Table 5. The total BW for which the layout is being carried out is set at 50 MHz split in to 5 frequency bins of 10 MHz each. The maximum number of IRs supported by the hardware is capped at 15 and only four different symbol rates are chosen for simplicity. The simulation time depends on the parameters, but the optimized solution does not.

TABLE 5

| Simulation parameters | |
|---|---|
| Parameter | Value |
| Total BW Available | 50 MHz |
| Frequency bins | 5 (10 MHz each) |
| Max Number of carriers | 15 |
| Channel Spacing | 1.25 |
| IG set | {4, 2, 1, 0.5} |
| Target SNR | {13, 11.5, 10, 8.5, 6, 4.5, 3} dB |
| Efficiency Modcod | [2.7, 2.4, 2, 1.8, 1.6, 1.33, 1] bps |
| PAF | [+2, + 1, 0, −1, −2] dB |

A set of 1000 terminals across a beam with a quadratic or Gaussian distribution of SNR was chosen to represent the measure of power in the system. Two different sets of link conditions for rain and clear sky with different average SNR were used to illustrate the difference in the optimized solutions that the algorithms provide. The distribution of terminal SNR and the SpecTab and LinkTab for both sets of link conditions are depicted below. The rain impact is 3 dB.

Figure 10:
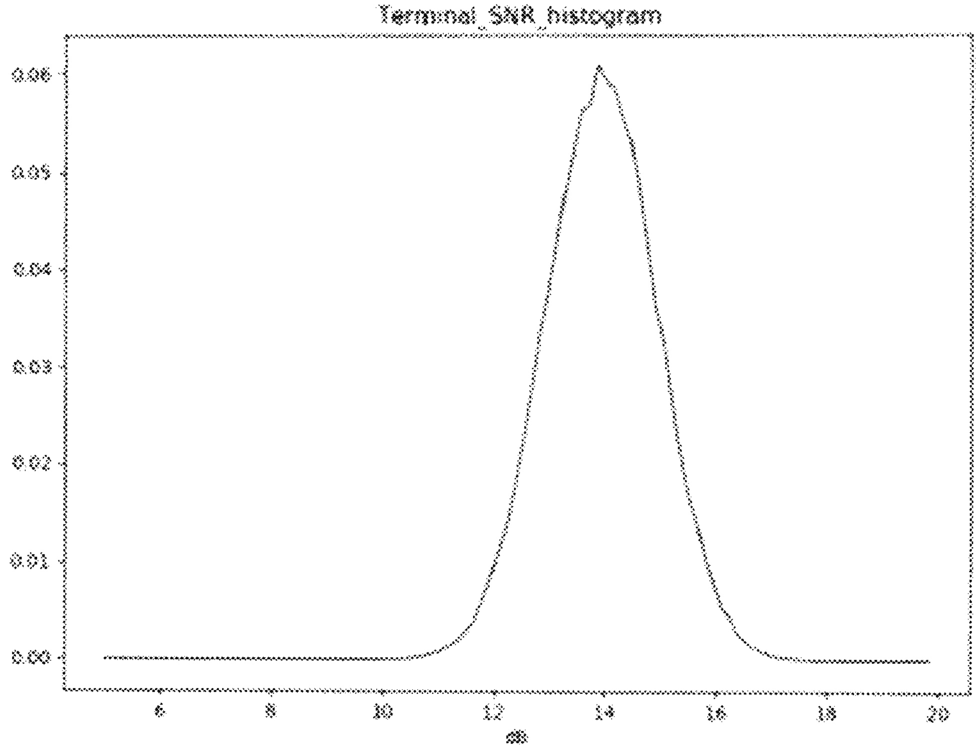
FIG. 10 is a plot of signal to noise ratio under clear sky conditions, according to one embodiment.

FIG. 10 is a plot of signal to noise ratio under clear sky conditions.

TABLE 6

| CS SpecTab | | | | | |
|---|---|---|---|---|---|
| | Fbin 1 | Fbin 2 | Fbin 3 | Fbin 4 | Fbin 5 |
| 4M | 2.00E−03 | 2.63E−02 | 1.79E−01 | 5.32E−01 | 9.67E−01 |
| 2M | 5.32E−01 | 9.67E−01 | 1.27E+00 | 1.45E+00 | 1.58E+00 |
| 1M | 1.45E+00 | 1.58E+00 | 1.67E+00 | 1.78E+00 | 1.92E+00 |
| 0.5M | 1.78E+00 | 1.92E+00 | 2.11E+00 | 2.33E+00 | 2.53E+00 |

TABLE 7

| CS LinkTab | | | | | |
|---|---|---|---|---|---|
| | Fbin 1 | Fbin 2 | Fbin 3 | Fbin 4 | Fbin 5 |
| 4M | 0.99866 | 0.97725 | 0.84102 | 0.49979 | 0.15965 |
| 2M | 0.49979 | 0.15965 | 0.02246 | 0.00144 | 0 |
| 1M | 0.00144 | 0 | 0 | 0 | 0 |
| 0.5M | 0 | 0 | 0 | 0 | 0 |

Figure 11:
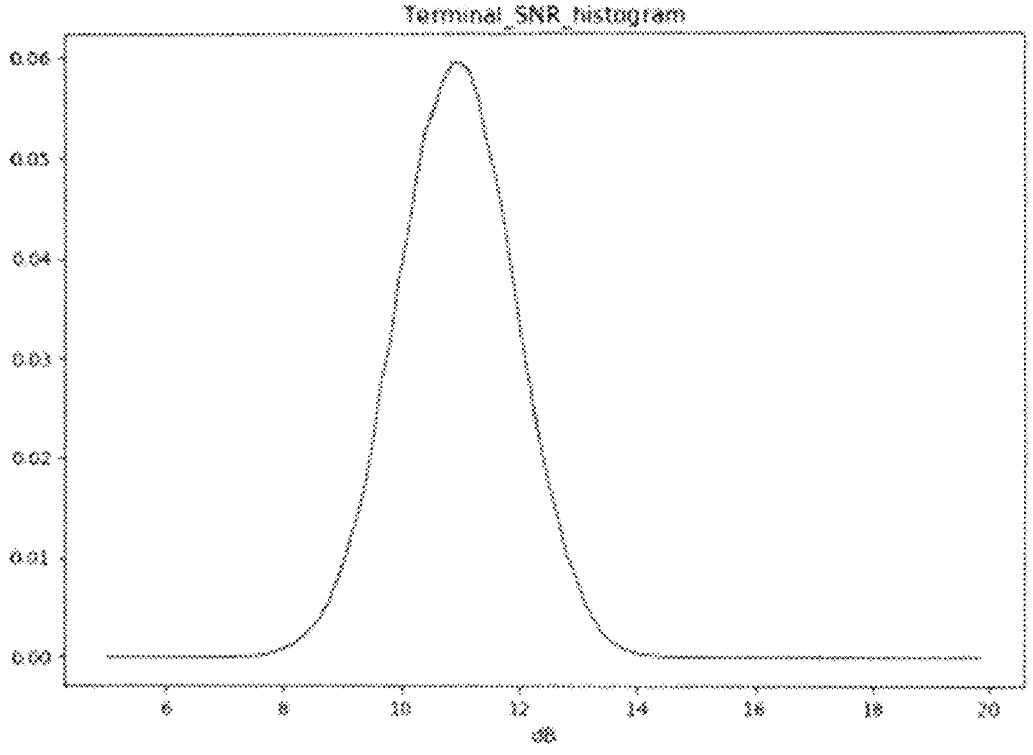
FIG. 11 is a plot of signal to noise ratio under rain conditions, according to one embodiment.

FIG. 11 is a plot of signal to noise ratio under rain conditions.

TABLE 8

| Rain SpecTab | | | | | |
|---|---|---|---|---|---|
| | Fbin 1 | Fbin 2 | Fbin 3 | Fbin 4 | Fbin 5 |
| 4M | 0.00E+00 | 0.00E+00 | 4.00E−05 | 1.24E−03 | 2.27E−02 |
| 2M | 1.24E−03 | 2.27E−02 | 1.61E−01 | 5.25E−01 | 9.53E−01 |
| 1M | 5.25E−01 | 9.53E−01 | 1.25E+00 | 1.45E+00 | 1.57E+00 |
| 0.5M | 1.45E+00 | 1.57E+00 | 1.66E+00 | 1.77E+00 | 1.92E+00 |

TABLE 9

| Rain LinkTab | | | | | |
|---|---|---|---|---|---|
| | Fbin 1 | Fbin 2 | Fbin 3 | Fbin 4 | Fbin 5 |
| 4M | 1.00E+00 | 1.00E+00 | 1.00E+00 | 9.99E−01 | 9.77E−01 |
| 2M | 9.99E−01 | 9.77E−01 | 8.41E−01 | 4.98E−01 | 1.59E−01 |
| 1M | 4.98E−01 | 1.59E−01 | 2.29E−02 | 1.39E−03 | 4.00E−05 |
| 0.5M | 1.39E−03 | 4.00E−05 | 0.00E+00 | 0.00E+00 | 0.00E+00 |

Algorithm Version 1

Case 1: No Constraint on the Number of Channels

Figure 12:
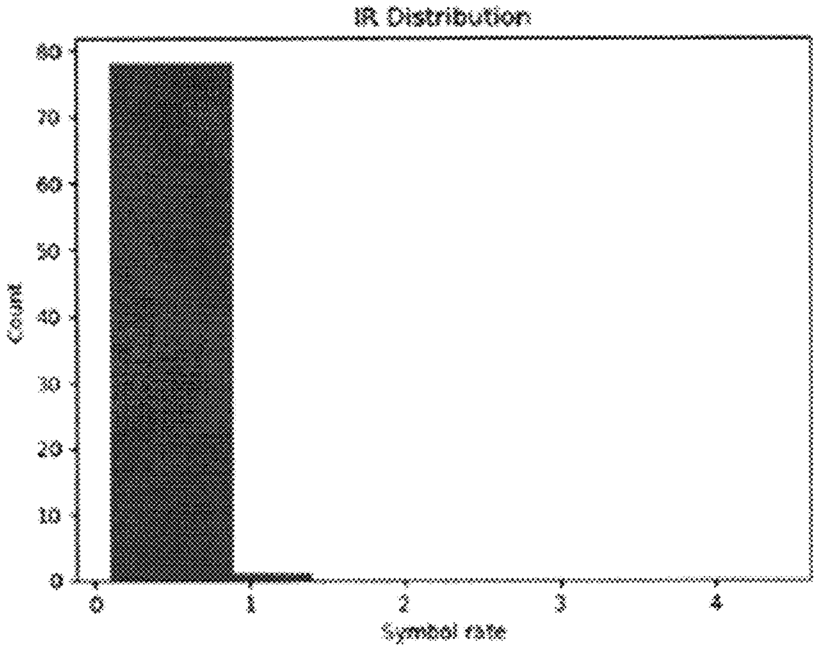
FIG. 12 is a diagram illustrating inroute layout, according to one embodiment.

The algorithm optimizes to find 2 IGs, 0.5 and 1M with 79 and 1 IRs respectively. The most optimal solution would be to place all IRs as 0.5M since the highest spectral efficiency is obtained at 0.5M. FIG. 12 illustrates the corresponding IR layout.

Case 2: Additional Constraint of Nc<=15

Figure 13:
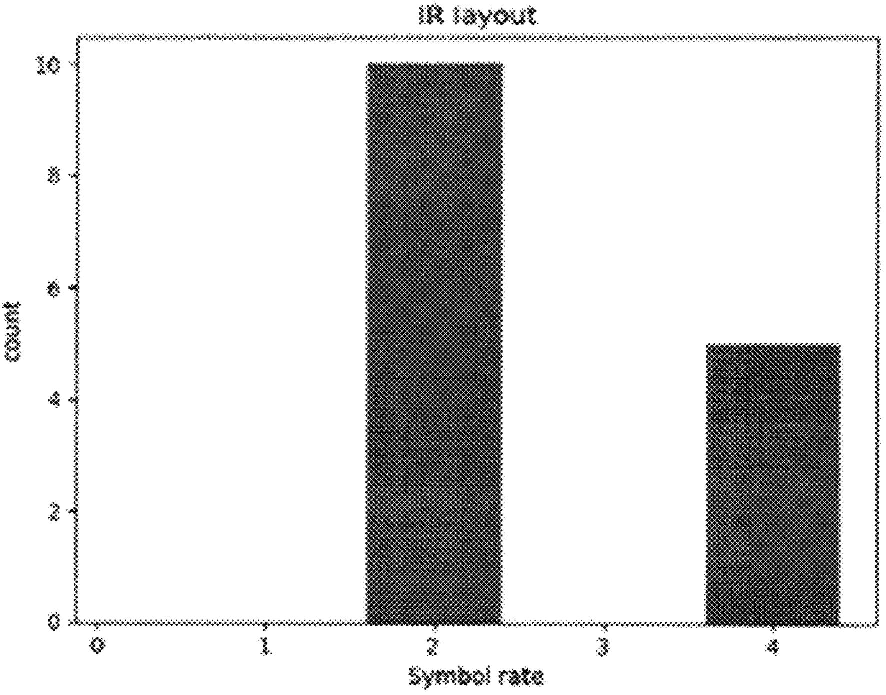
FIG. 13 is a diagram illustrating inroute layout, according to another embodiment.

The algorithm optimizes to find a set of 2 IGs 2M and 4M, with 10 and 5 IRs, respectively. Since the number of IRs are constrained, the algorithm finds an optimal solution in which higher symbol rates are used to allow the bandwidth to be fully utilized. FIG. 13 illustrates the corresponding IR layout.

Algorithm Version 2

Case 1: Clear Sky

Figure 14:
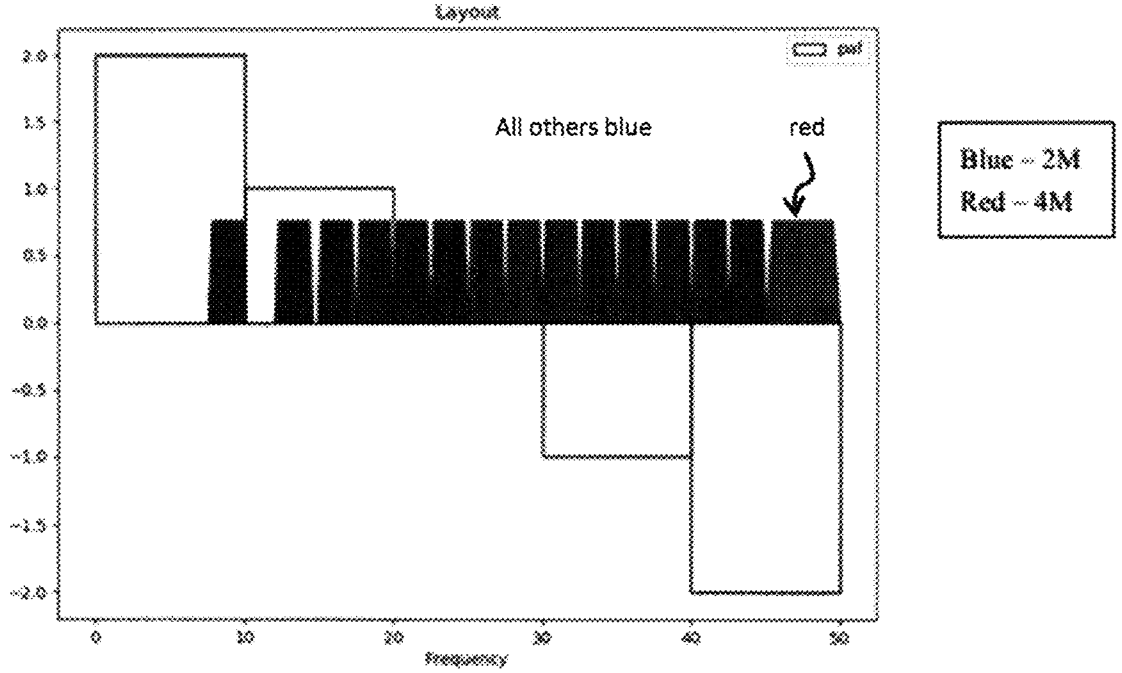
FIG. 14 is a diagram illustrating inroute layout under clear sky, according to one embodiment.

The most optimal solution in this scenario is to place 15, 2M IRs to maximize the IR capacity. The algorithm output as shown in FIG. 14 is 1, 4M IR at the frequency bin where PAF is −2 dB and 14, 2M IRs which is very close to the maximum IR capacity. Due to the high spectral efficiency of the frequency bin at the high edge a 4M can be placed there.

Case 2: Rain

Figure 15:
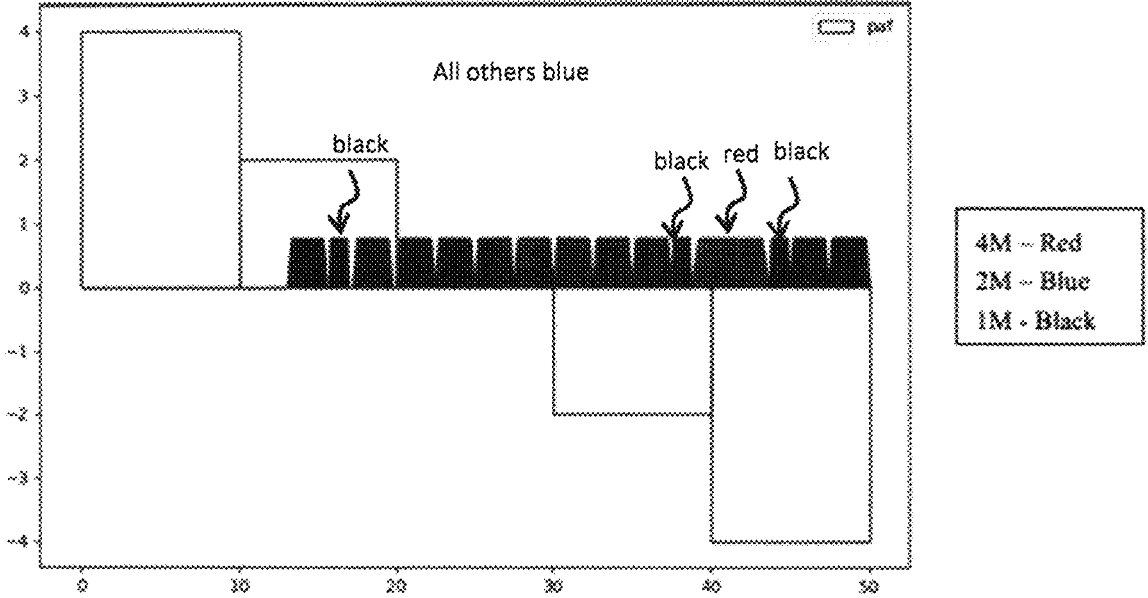
FIG. 15 is a diagram illustrating inroute layout under rain conditions, according to one embodiment.

In the case with rain, there is a fall in the spectral efficiency across the bins, leading to the deployment of some 1M IRs. FIG. 15 illustrates the corresponding IR layout.

Algorithm Version 3

The case 1 below is clear sky and case 2 is rain of 3 dB. the clear sky case is optimized from an initial state of 1 carrier. The result is very close (1.2 Mb less, 38.8 versus 40.1 Mbps) to the most optimum solution possible (hand calculated). This simulation was run for 5e6 iterations. The test case 2 in rain was calculated using the initial state derived from 1. The number of iterations was only 3e5. The solution found is again very close to the optimum (22 versus 22.36 Mbps).

Case 1: Clear Sky

Figure 16:
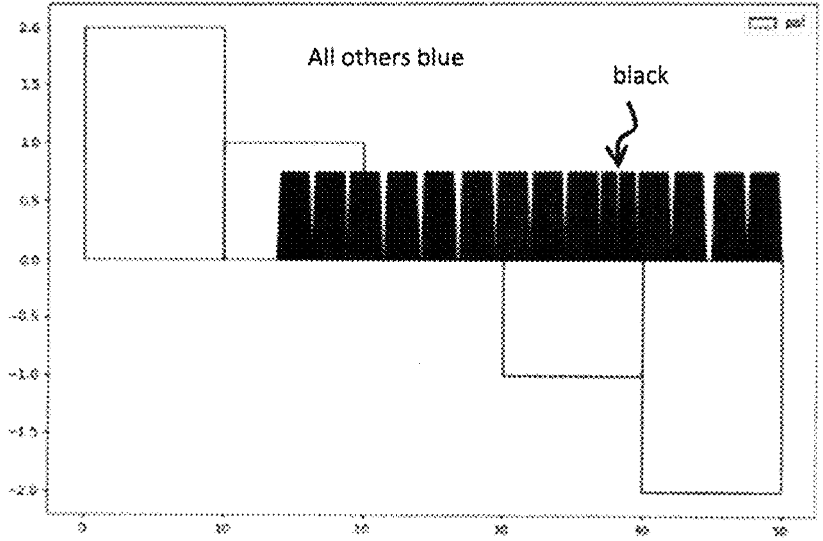
FIG. 16 is a diagram illustrating inroute layout under clear sky, according to another embodiment.

FIG. 16 illustrates the corresponding IR layout.

Case 2: Rain

Figure 17:
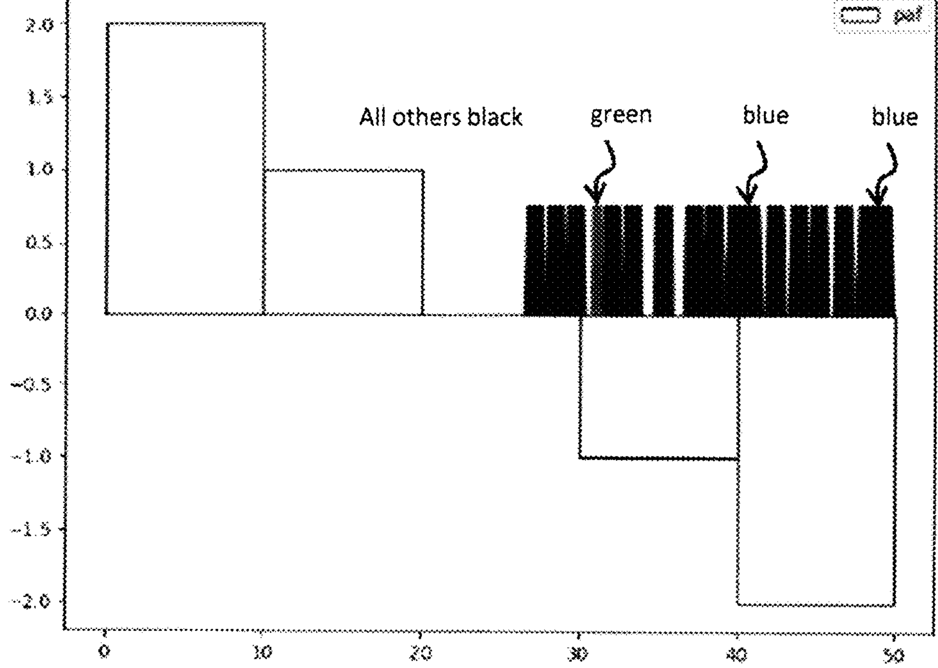
FIG. 17 is a diagram illustrating inroute layout under rain conditions, according to another embodiment.

FIG. 17 illustrates the corresponding IR layout.

Non-Contiguous Spectrum

Figure 18A:
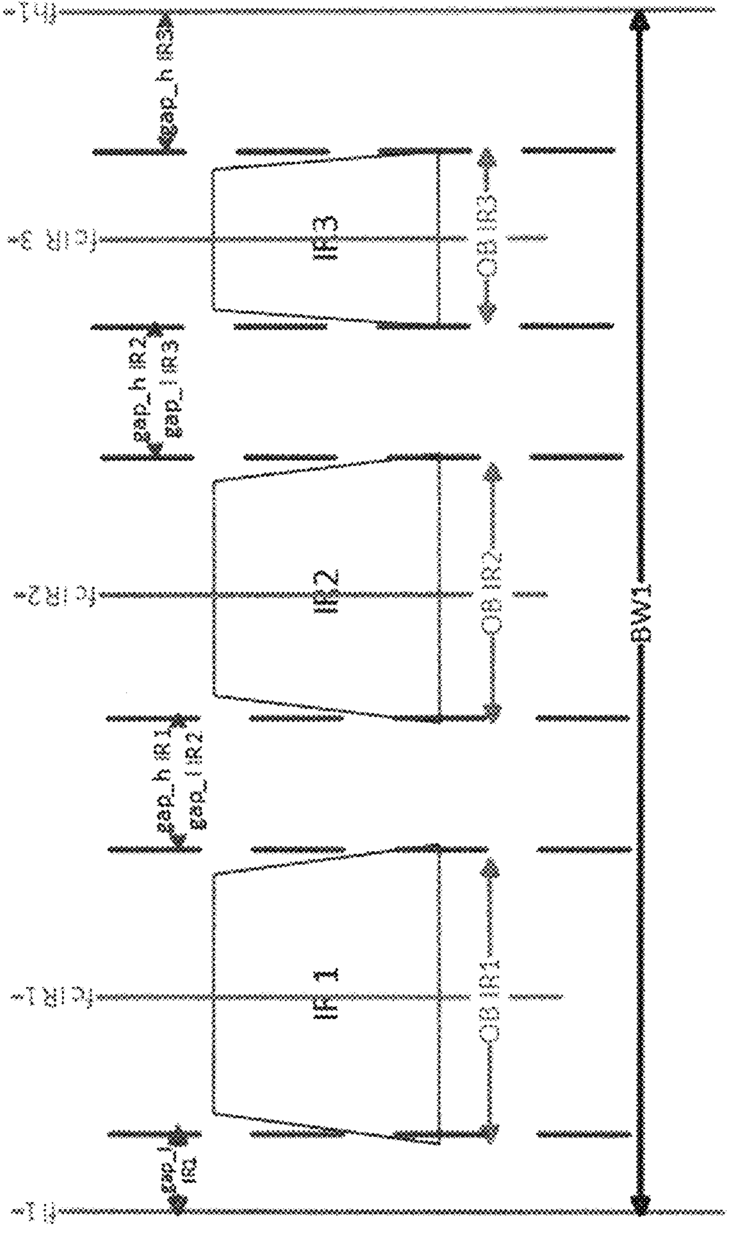
FIG. 18A is a diagram illustrating inroute layout for a first portion of non-contiguous spectrum, according to one embodiment.
Figure 18B:
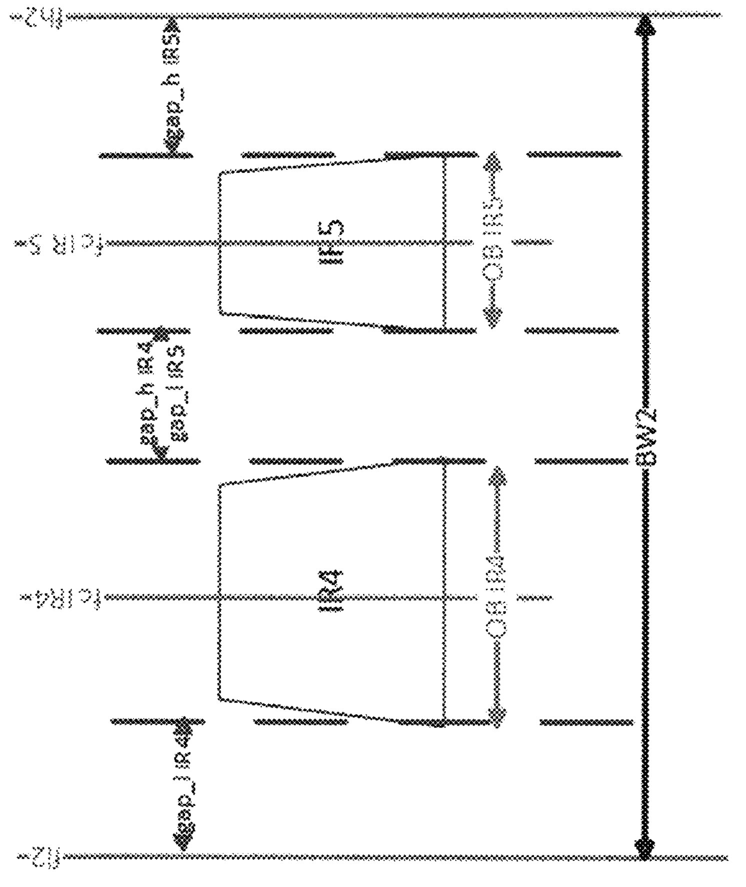
FIG. 18B is a diagram illustrating inroute layout for a second portion of non-contiguous spectrum, according to one embodiment.

The algorithm and simulations previously discussed detail the IR layout process for a contiguous spectrum chunk. It is possible, however, that the bandwidth available for performing the IR layout is non-contiguous. The spacing and layout rules need to accommodate that while performing the optimization. This is depicted in the FIGS. 18A and 18B. There are two separate sections of spectrum. Although the optimization would use the properties of both chunk simultaneously, the layout rules will make sure that the chunks are treated as such.

The spacing rules from Algorithm version 2 can be modified to adapt to this scenario in the following manner.

$$\sum_{i=1}^{n} OB_{IR_i} \le (BW_1 + BW_2)$$

If p IRs are placed in chunk 1 and n−p are placed in chunk 2, $$f_{l1} < fc_{IR_1} < fc_{IR_2} <, \ldots, < fc_{IR_p} < f_{h1} \text{ and}$$

$$f_{l2} < fc_{IR_{p+1}} < fc_{IR_{p+2}} <, \ldots, < fc_{IR_n} < f_{h2}$$

Since all the occupied bandwidth needs to be within the available bandwidth chunks.

$$fc_{IR_1} - \frac{OB_{IR_1}}{2} \ge f_{l1};\ fc_{IR_{p+1}} - \frac{OB_{IR_{p+1}}}{2} \ge f_{l2} \text{ and}$$

$$fc_{IR_p} + \frac{OB_{IR_p}}{2} \le f_{h1};\ fc_{IR_n} + \frac{OB_{IR_n}}{2} \ge f_{h2}$$

While choosing the center frequency of a certain $IR_{a+1}$, $fc_{IR_{a+1}}$, a random number is chosen with a uniform distribution from the range of frequencies that lie between $fcmin_{IR_{a+1}}$ and $fcmax_{IR_{a+1}}$ $$fc_{IR_{a+1}} \in [fcmin_{IR_{a+1}}, fcmax_{IR_{a+1}}]$$

$$fcmin_{IR_{a+1}} = \left(fc_{IR_a} + \frac{(OB_{IR_a} + OB_{IR_{a+1}})}{2}\right);$$

For the first spectrum chunk $$\text{for } a = 0,\ fcmin_{IR_1} = f_{l1} + \frac{OB_{IR_1}}{2}$$

$$fcmax_{IR_{a+1}} = fcmin_{IR_{a+1}} + \left(f_{h1} - \left(fc_{IR_a} + \frac{OB_{IR_a}}{2}\right)\right) - \sum_{i=a+1}^{n} (OB_{IR_i})$$

For the second chunk $$\text{for } a = p,\ fcmin_{IR_{p+1}} = f_{l2} + \frac{OB_{IR_{p+1}}}{2}$$

$$fcmax_{IR_{a+1}} = fcmin_{IR_{a+1}} + \left(f_{h2} - \left(fc_{IR_a} + \frac{OB_{IR_a}}{2}\right)\right) - \sum_{i=a+1}^{n} (OB_{IR_i})$$

For algorithm version 3 where multiple singular operations are executed, the gaps must be calculated carefully for the IRs adjoining the spectrum chunk boundary.

$$gapl_{IR_{i+1}} = gaph_{IR_i} = \left(fc_{IR_{i+1}} - \frac{OB_{IR_{i+1}}}{2}\right) - \left(fc_{IR_i} + \frac{OB_{IR_i}}{2}\right);$$

for chunk 1, $$gapl_{IR_1} = \left(fc_{IR_1} - \frac{OB_{IR_1}}{2}\right) - f_{l1};\ gaph_{IR_p} = f_{h1} - \left(fc_{IR_p} + \frac{OB_{IR_p}}{2}\right)$$

for chunk 2, $$gapl_{IR_{p+1}} = \left(fc_{IR_{p+1}} - \frac{OB_{IR_{p+1}}}{2}\right) - f_{l2};\ gaph_{IR_n} = f_{h2} - \left(fc_{IR_n} + \frac{OB_{IR_n}}{2}\right);$$

Rule Based Algorithm

According to one or more embodiments, a set of pre-defined, static rules can be used to arrive at the best possible IR layout for a given set of inputs about the system. The rules can be configured to cater to the constraints. The rules can be used to maximize the IR capacity and subsequently confirm that the constraints are also met. The SpecTab can be used to create an initial IR mix (number of IRs per IG per frequency bin) that maximizes capacity and then the mix can be modified as per the constraints from the LinkTab and CSTab. Once the IR mix is finalized, the layout may be done where the center frequencies of the IRs will be calculated following the spacing rules.

Calculate IR Mix Using the SpecTab

The premise of this algorithm is to find the IR mix that maximizes the total capacity of the GW using the SpecTab, and then change the layout to cater to other requirements such as CIR and link closure. The constraints on the system are the total BW available and the number of carriers supported. A general rule is that the capacity will increase as the BW occupied by the layout increases and the symbol rates supported are lower, since the efficiency is greater at the lower symbol rates. However, the use of lower symbol rate IRs increases the channel count.

1. Calculate the throughput measure for each frequency bin and symbol rate a. The throughput measure is the product of the symbol rate with the spectral efficiency.

b.

$$ThMeas_{fbin_i Sym_j} = Sym_j * SpecEff_{Sym_j fbin_i}$$

2. Find the maximum throughput measure across symbol rates for each frequency bin.

a.

$$ThMeas\text{Max}_{fbin_i} = \max_{Sym_j}\left(ThMeas_{fbin_i Sym_j}\right)$$

b. The symbol rate corresponding to the maximum throughput measure is $\text{SymMax}_{fbin_i}$ 3. Order the maximum throughput measures across frequency bins and find the minimum and maximum a.

$$\text{Min}ThMeas\text{Max} = \min_{fbin_i} ThMeas\text{Max}_{fbin_i}$$

b. The frequency bin corresponding to the minimum is fbinMin c.

$$MaxThMeasMax = \max_{fbin_i} ThMeasMax_{fbin_i}$$

d. The frequency bin corresponding to the maximum is fbinMax

The maximum throughput measure allows us to gauge the maximum symbol rate that allows an increase in capacity with the same number of IR carriers at that symbol rate. A symbol rate higher than this would essentially drop the capacity even though the BW occupied would increase.

4. Calculate the minimum symbol rate that can be deployed across the BW due to the constraint in the total number of carriers a.

$$SymMin = \frac{BW}{Nc * CarrierSpacing}$$

5. Since the symbol rates available are in steps, SymMin might fall in between two symbol rates ($\text{SymMin}_L$, $\text{SymMin}_H$) of the system and the IR mix will be a combination of both (and potentially others). If the max throughput measure gives a value lower than SymMin, then that value can be used as both minimum and maximum symbol rates possible for that bin. $\text{SymMin}_{fbin_i}=\min(\text{SymMin}_L, \text{SymMax}_{fbin_i})$ b. If there is a CIR requirement (or a minimum symbol rate tied to a certain service plan) then that can be incorporated here.

$$SymMin_{fbin_i} = \max\left(minSym_{\frac{CIR}{SP}}, \min(SymMin_L,\ SymMax_{fbin_i})\right)$$

6. First the IR layout will be done by using the $\text{SymMin}_{fbin_i}$. Since this is the minimum symbol rate to be deployed, the capacity is maximized within the constraints. It is possible that the number of channels is exceeded and then the symbol rates will be increased to reduce the channel count. The IR symbol rate can be reduced only if the link closure requirement needs to be met.

7. For each frequency bin calculate number of IRs at frequency bin, 'i', with symbol rate $\text{SymMin}_{fbin_i}$ a.

$$IR_{fbin_i} = \left\lfloor \frac{BW_{fbin_i}}{SymMin_{fbin_i} * CarrierSpacing} \right\rfloor;$$

where $BW_{fbin_i}$ is the bandwidth in the frequency bin i

8. If the total sum of all IRs to be deployed is greater than the maximum possible (Nc)

$$\sum_{i=1}^{nfbin} nIR_{fbin_i} > Nc$$

a. Starting with the fbinMax, and progressing through frequency bins with decreasing $\text{ThMeasMax}_{fbin_i}$, convert the IRs in the bin to the next higher symbol rate IR. For e.g. two 1 Msps channels can be replaced by 1 2 Msps channel.

i. If the $\text{SymMin}_L=\text{SymMax}_{fbin_i}$, then the symbol rate for IRs in that bin cannot be increased.

b. Repeat step a until the total channel count<=Nc or if the symbol rate on none of the frequency bins can be increased c. If the channel count is >Nc i. Starting from the frequency bin fbinMin, and traversing through frequency bins with increasing $ThMeasMax_{fbin_i}$, delete IRs until the channel count is equal to Nc.

9. Else a. Calculate per frequency bin any unused BW i.

$$UnusedBW_{fbin_i} = BW_{fbin_i} - \sum SymMax_{fbin_i} * CarrierSpacing$$

ii. This BW will be insufficient to fit an IR with $SymMin_{fbin_i}$ but for purposes of maximizing capacity, an IR will be placed there.

b. While $$\sum_{i=1}^{nfbin} nIR_{fbin_i} < Nc$$

step through the frequency bins i. Find maximum symbol rate whose occupied BW<unused BW ii.

$$\underset{Sym}{\text{Max}}(SetofSymRate * CarrierSpacing - UnusedBW_{fbin_i}) \leq 0;$$

a. where SetofSymRate is the set of symbol rates available in the system.

iii. Add the symbol rate found in step b to the IR mix for that frequency bin.

Figure 19:
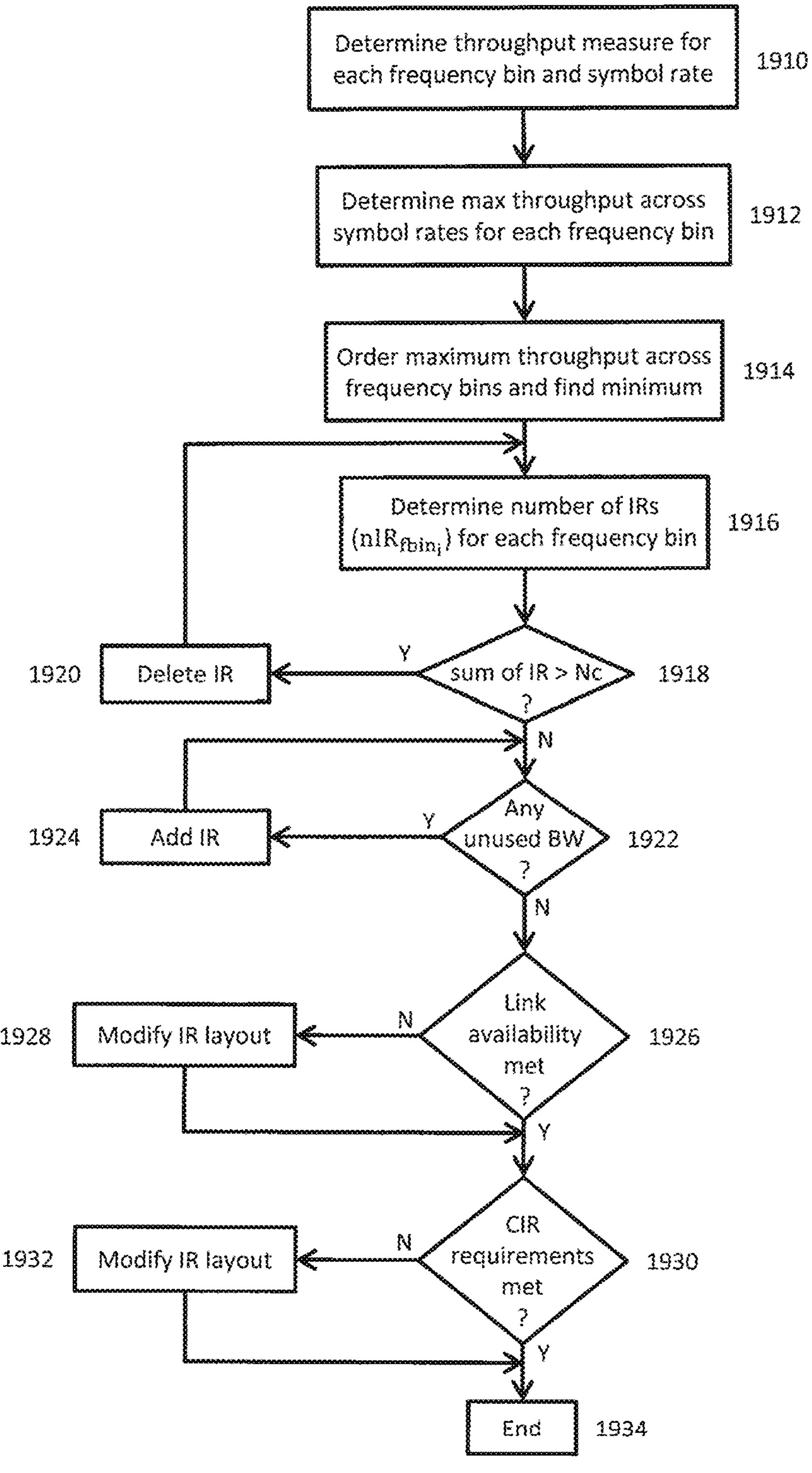
FIG. 19 is a flowchart of a process for dynamic inroute reconfiguration using static rules, in accordance with additional embodiments.

FIG. 19 illustrates a process for dynamic inroute reconfiguration using static rules. According to the illustrated embodiment, the rules being applied corresponds to a selected value for the link availability in the system and committed information rate (CIR) for certain terminals. Additional rules can also be selected by a network operator, or appropriate entity, and utilized alone or in combination with those shown in FIG. 19. For example, the rules can define desired values for the total IR capacity, highest throughput for a particular terminal or terminal type, terminal backlog, amount of unused bandwidth, etc. The rules can further be selected based on various factors for purposes of achieving certain network performance levels or operational conditions. Thus, the foregoing rules should be considered exemplary and not limiting.

At 1910, the throughput measure for each frequency bin and symbol rate is determined. As previously discussed, the throughput measure is the product of the symbol rate and the spectral efficiency. At 1912, the maximum throughput across all symbol rates for each frequency bin is determined. At 1914, the maximum throughputs across all frequency bins are ordered. For example, the maximum throughput level from each frequency bin can be selected and organized in the form of a list. The minimum value (and maximum value) from the list are obtained.

At 1916, the number of inroutes for each frequency bin is determined. At 1918, it is determined whether the sum of all current inroutes is greater than the maximum number of possible (or allowed) inroutes. If the current sum of inroutes is greater, then at 1920, one of the inroutes is deleted. Control then returns to 1916. If the sum of inroutes is not greater than the maximum number of allowable inroutes, then control passes to 1922. It is determined whether any unused bandwidth currently exists. If there is additional bandwidth that is currently unused, then at 1924, an additional inroute is added. Control then returns to 1922 in order to determine if the newly added inroute has utilized the unused bandwidth. This process continues until sufficient inroutes have been added to utilize all of the available bandwidth. If there is no unused bandwidth, however, then control passes to 1926.

At 1926, it is determined whether the link availability requirements have been met. As previously discussed, the link availability corresponds to the percentage of terminals capable of achieving the most robust MODCOD present in the system. The specific link availability requirement corresponds to the rule defined by the system operator, or authorized personnel, to reconfigure the inroutes. If the link availability requirements have been met, then control passes to 1930. However, if the link availability requirements have not been met, then control passes to 1928 where the current inroute layout is modified. Upon modifying the inroute layout, control passes to 1930.

According to one or more embodiments, control can optionally return to 1926 in order to determine if the modifications to the inroute layout have resulted in the link availability requirements being met. This can further be repeated a preset number of times, as desired by the network operator. In other words, the IR layout can be modified and checked, for example, ten times in order to determine whether the link availability requirement has been met. According to further embodiments, a threshold level can be used, alone or in combination with the preset number of times to repeat, as a convergence criteria for terminating the IR layout modifications. In other words, a threshold value of 5% can be used to indicate that a current link availability value that is within 5% of the link availability criteria set by the system operator would satisfy the comparison at 1926.

At 1930, it is determined whether the committed information rate (or CIR) requirements have been met. If the requirements have not been met, then the current layout is modified at 1932. The process would then end at 1934. Similarly, if the CIR requirements have been met, the process would end. Depending on the specific implementation, control can optionally return to 1926 in order to determine if the CIR requirements have been satisfied after modifying the IR layout. This can also be repeated a predetermined number of times, as desired by the network operator in a manner similar to that previously described with respect to the link availability requirements. Once the process ends at 1934, the current IR layout would become the final IR layout.

Modify the IR Mix

Looking at the LinkTab, some IRs might be required at certain symbol rates to ensure the availability constraints are met. In addition, to allow certain mis-pointed terminals to close link and to allow for a slow response time from the DIR manager, the lowest symbol rate supported by the system, might be deployed. The CIRTab can also be used to add IRs that are required to meet the CIR.

The modification can occur by either replacing multiple lower symbol rate IRs into a higher symbol rate IR to meet CIR requirements, or by replacing a higher symbol rate IR with multiple lower symbol rate IRs to meet link availability requirements. Once this modification has occurred, the total number of IRs in the mix has changed, and steps 5 and 6 above need to be repeated.

Layout Rules

ACI can be used to dictate spacing and adjacent carrier placement. This will be dependent on system hardware and configuration. The layout shall be done from lowest frequency in the spectrum to the higher frequency.

EXAMPLE 1

Using the example from Section 6.6.4.6 for clear sky, we have Nc=15, Total BW=50 MHz divided in to 5 frequency bins of 10 MHz each. The carrier spacing is 1.25. We can calculate the measure of throughput at each frequency bin as depicted in the Table 10 Throughput.

TABLE 10

| Throughput measure | | | | | |
|---|---|---|---|---|---|
| | Fbin 1 | Fbin 2 | Fbin 3 | Fbin 4 | Fbin 5 |
| 4M | 0.008 | 0.1052 | 0.716 | 2.128 | 3.868 |
| 2M | 1.064 | 1.934 | 2.54 | 2.9 | 3.16 |
| 1M | 1.45 | 1.58 | 1.67 | 1.78 | 1.92 |
| 0.5M | 0.89 | 0.96 | 1.055 | 1.165 | 1.265 |

The maximum throughput measures for each frequency bin are used to select symbol rates deployed at that frequency bin. Hence: 4M for fbicn#5, and 2M for fbins#2, fbins#3, fbins#4, and 1M for fbin#1. The minimum symbol rate to be deployed can be calculated as $$SymMin = \frac{50\text{M}}{15 * 1.25} = 2.67\text{M}$$

Assuming no CIR requirements $\text{SymMin}_{fbin_i}$=min(Sym-$\text{Min}_L$, $\text{SymMax}_{fbin_i}$)=2M for bins 2-5 and 1M for bin1

The number of IRs in a frequency bins 2-5 of the designated symbol rate is calculated as $$nIR_{fbin_i} = \left\lfloor \frac{10}{2 * 1.25} \right\rfloor = 4.$$

For fbin#1 this number is 10 MHz/(1*1.25)=8. The total number of IRs that will be placed in this fashion is (8+4+4+4+4)=24.

TABLE 11

| Number of IRs - first step | | | | | |
|---|---|---|---|---|---|
| | Fbin 1 | Fbin 2 | Fbin 3 | Fbin 4 | Fbin 5 |
| 4M | 0 | 0 | 0 | 0 | 0 |
| 2M | 0 | 4 | 4 | 4 | 4 |
| 1M | 8 | 0 | 0 | 0 | 0 |
| 0.5M | 0 | 0 | 0 | 0 | 0 |

Since the number of channels (24) exceeds the maximum channel count, the IR symbol rate will be increased if possible. In this example fbin5 is the only bin whose symbol rate can be increased. The 4, 2M IRs are converted to 2, 4M IRs reducing the count to 22. Since this is still insufficient IRs have to be deleted.

Starting from the least of the maximum throughput measures removing the IRs until total number of IRs is equal to Nc which is 15 in this case. The resulting IR mix is as shown in Table 11 Number of IRs.

TABLE 11

| Number of IRs | | | | | |
|---|---|---|---|---|---|
| | Fbin 1 | Fbin 2 | Fbin 3 | Fbin 4 | Fbin 5 |
| 4M | 0 | 0 | 0 | 0 | 2 |
| 2M | 0 | 4 | 4 | 4 | 0 |
| 1M | 1 | 0 | 0 | 0 | 0 |
| 0.5M | 0 | 0 | 0 | 0 | 0 |

Looking at the LinkTab from the same example, we can see that the availability is not being met by the current IR mix.

TABLE 12

| CS LinkTab | | | | | |
|---|---|---|---|---|---|
| | Fbin 1 | Fbin 2 | Fbin 3 | Fbin 4 | Fbin 5 |
| 4M | 0.99866 | 0.97725 | 0.84102 | 0.49979 | 0.15965 |
| 2M | 0.49979 | 0.15965 | 0.02246 | 0.00144 | 0 |
| 1M | 0.00144 | 0 | 0 | 0 | 0 |
| 0.5M | 0 | 0 | 0 | 0 | 0 |

The IR mix is modified by changing the 2, 4M IRs in the fbin#5 to 1, 4M and 2, 2M IRs. Since this increases the number of IRs to 16, 1 IR from Fbin#1 will be removed. The final IR mix is this

TABLE 13

| Final IR mix | | | | | |
|---|---|---|---|---|---|
| | Fbin 1 | Fbin 2 | Fbin 3 | Fbin 4 | Fbin 5 |
| 4M | 0 | 0 | 0 | 0 | 1 |
| 2M | 0 | 4 | 4 | 4 | 2 |
| 1M | 0 | 0 | 0 | 0 | 0 |
| 0.5M | 0 | 0 | 0 | 0 | 0 |

The IR layout done by the spacing rules will result in a set of center frequencies that are given by (assuming fl=0 and fh=50 MHz), as shown below

TABLE 14

| IR Layout | |
|---|---|
| IR Symbol Rate | Center Frequency |
| 2 | 11.25 |
| 2 | 13.75 |
| 2 | 16.25 |
| 2 | 18.75 |
| 2 | 21.25 |
| 2 | 23.75 |
| 2 | 26.25 |
| 2 | 28.75 |
| 2 | 31.25 |
| 2 | 33.75 |
| 2 | 36.25 |
| 2 | 38.75 |
| 2 | 41.25 |
| 2 | 43.75 |
| 4 | 47.5 |

EXAMPLE 2

Using the same example as before for rain, we have Nc=15, Total BW=50 MHz divided in to 5 frequency bins of 10 MHz each. The measure of throughput at each frequency bin as depicted in table 15 below.

TABLE 15

| Throughput measure | | | | | |
|---|---|---|---|---|---|
| | Fbin 1 | Fbin 2 | Fbin 3 | Fbin 4 | Fbin 5 |
| 4M | 0 | 0 | 0 | 0 | 0.09 |
| 2M | 0 | 0.05 | 0.32 | 1.05 | 1.91 |
| 1M | 0.52 | 0.95 | 1.25 | 1.45 | 1.57 |
| 0.5M | 0.72 | 0.79 | 0.83 | 0.89 | 0.96 |

The symbol rate corresponding to the throughput measure is lower or equal to the minimum from the channel count which is 2M. Hence the symbol rates deployed in the initial first step layout will correspond to the ones marked in color above so 2M for fbin#5 and 1M for fbins#2,3,4 and 0.5M for fbin#1. The number of IRs in fbin#5 is 10 MHz/(2*1.25)=4 and 10/(1*1.25)=8 for fbin 4 and so on. The total number of IRs that will be placed in this fashion is (4+8+8+8+16)=44. Since none of the frequency bins can have an increase in symbol rate, IRs need to be deleted. Starting from the least of the maximum throughput measures (one marked in brown) removing the IRs until total number of IRs is equal to Nc which is 15 in this case. The resulting IR mix is shown below.

TABLE 16

| Number of IRs | | | | | |
|---|---|---|---|---|---|
| | Fbin 1 | Fbin 2 | Fbin 3 | Fbin 4 | Fbin 5 |
| 4M | 0 | 0 | 0 | 0 | 0 |
| 2M | 0 | 0 | 0 | 0 | 4 |
| 1M | 0 | 0 | 3 | 8 | 0 |
| 0.5M | 0 | 0 | 0 | 0 | 0 |

Looking at the LinkTab from the same example, we can see that the availability is not being met by the current IR mix. A 0.5 M IR is required in either fbin#3, 4, or 5.

TABLE 17

| Rain LinkTab | | | | | |
|---|---|---|---|---|---|
| | Fbin 1 | Fbin 2 | Fbin 3 | Fbin 4 | Fbin 5 |
| 4M | 1 | 1 | 1 | 0.999 | 0.977 |
| 2M | 0.999 | 0.977 | 0.841 | 0.498 | 0.159 |
| 1M | 0.498 | 0.159 | 0.0229 | 0.00139 | 0.00004 |
| 0.5M | 0.00139 | 0.00004 | 0 | 0 | 0 |

Since the drop from 1M to 0.5M in fbin#3 is the least change in throughput ratio, the IR mix is modified by changing the 3 1M IRs to 2, 1M and 1, 0.5M. The final IR mix is this

TABLE 18

| Final IR mix | | | | | |
|---|---|---|---|---|---|
| | Fbin 1 | Fbin 2 | Fbin 3 | Fbin 4 | Fbin 5 |
| 4M | 0 | 0 | 0 | 0 | 0 |
| 2M | 0 | 0 | 0 | 0 | 4 |
| 1M | 0 | 0 | 2 | 8 | 0 |
| 0.5M | 0 | 0 | 1 | 0 | 0 |

The layout is shown in the following:

TABLE 19

| IR layout | |
|---|---|
| IR Symbol Rate | Center Frequency |
| 0.5 | 26.8125 |
| 1 | 27.75 |
| 1 | 29 |
| 1 | 30.25 |
| 1 | 31.5 |
| 1 | 32.75 |
| 1 | 34 |
| 1 | 35.25 |
| 1 | 36.5 |
| 1 | 37.75 |
| 1 | 39 |
| 2 | 40.875 |
| 2 | 43.375 |
| 2 | 45.875 |
| 2 | 48.375 |

EXAMPLE 3

Modifying example 2 by changing the number of carriers Nc=30.

$$SymMin = \frac{50M}{30 * 1.25} = 1.33M$$

The SymMin becomes 1M for all frequency bins. The initial layout is shown here with total number of channels=40

TABLE 20

| | Fbin 1 | Fbin 2 | Fbin 3 | Fbin 4 | Fbin 5 |
|---|---|---|---|---|---|
| 4M | 0 | 0 | 0 | 0 | 0 |
| 2M | 0 | 0 | 0 | 0 | 0 |
| 1M | 8 | 8 | 8 | 8 | 8 |
| 0.5M | 0 | 0 | 0 | 0 | 0 |

Since frequency bins 2-5 can achieve a higher symbol rate, we can go through the bins and increase the symbol rate of the IRs. Resulting in

TABLE 21

| | Fbin 1 | Fbin 2 | Fbin 3 | Fbin 4 | Fbin 5 |
|---|---|---|---|---|---|
| 4M | 0 | 0 | 0 | 0 | 0 |
| 2M | 0 | 0 | 2 | 4 | 4 |
| 1M | 8 | 8 | 4 | 0 | 0 |
| 0.5M | 0 | 0 | 0 | 0 | 0 |

Since this already meets the link closure requirements, there is no need to modify the layout.

Architecture and Deployment

Figure 20:
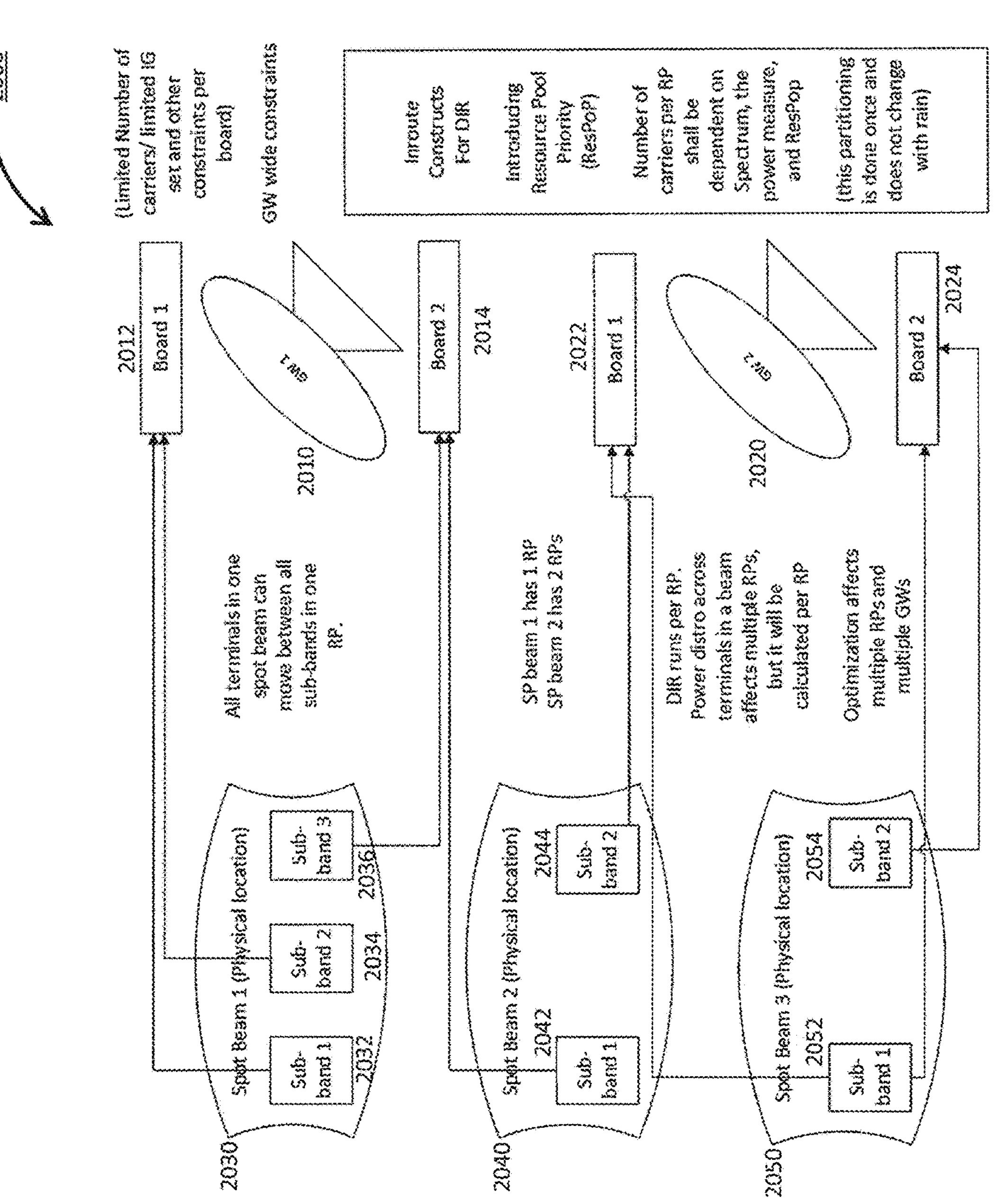
FIG. 20 is a diagram of a system capable of performing dynamic inroute reconfiguration, according to one embodiment.

FIG. 20 is a diagram of a system 2000 capable of performing dynamic inroute reconfiguration. According to one or more embodiments, the system includes two gateways, namely GW1 2010 and GW2 2020. Each GW 2010, 2020 can be configured to implement various features previously described over many beams across different hardware and resource constraints. The satellite network can consist of multiple GWs 2010, 2020, each of which is configured to serve multiple user beams with each beam having multiple terminals. Each user beam's terminals are allocated a portion of spectrum that could be contiguous or non-contiguous. Each GW 2010, 2020 can include multiple inroute demodulators (IDMs) each serving multiple beams at the same time. The number of IRs is limited for a single IDM serving different beams.

According to the illustrated embodiment, GW1 2010 serves beam_1 2030 and beam_2 2040, while GW2 2020 serves beam_2 2040 and beam_3 2050. Beam_2 is illustrated as being served by both GW1 2010 and GW2 2020. Each beam can include multiple sub-bands or spectrum chunks that are served by a hardware board on the GW. For example, beam_1 2030 contains three sub-bands (2032, 2034, 2036), beam_2 2040 contains two sub-bands (2042, 2044), and beam_3 2050 contains two sub-bands (2052, 2054). A sub-band can be defined as a contiguous IR spectrum and a hardware board is a hardware unit that services a certain number of IRs. As illustrated in FIG. 20, GW1 2010 includes hardware board_1 2012 and hardware board_2 2014, while GW2 2020 includes hardware board_1 2022 and hardware board_2 2024. The hardware boards can have constraints on the symbol rates/modulations/roll off factors with which they are configured to operate. A Resource Pool (RP) is a logical construct to enable the pooling of multiple IRs and associate them with a set of ORs. The RP can have multiple sub-bands but is serviced only by 1 GW. Beam_2 2040, for example, has 2 different RPs, each with one sub-band and served by a separate GW. Any individual RP can be serviced by multiple hardware boards on the GW.

While some factors or constraints can affect individual sub-bands or beams, others can affect a whole hardware board or GW. For example, a change in atmospheric conditions for spot beam_1 2030 will affect all three sub-bands (2032, 2034, 2036), which in turn will affect the layout on hardware board_1 2012 and hardware board_2 2014 of GW1 2010. The layout on hardware board_2 of GW1 2010 is also tied to spot beam_2 2040, whose link conditions have not changed. Due to the constraints on the hardware, it is possible that spot beam_2 sub-band 1 might have to undergo a change in its layout too. Similarly, if a portion of the spectrum from sub-band 1 (2042) of spot beam_2 2040 is redistributed to sub-band 2 (2044) of spot beam 2, the layouts on board_1 of GW2 2020 and board_2 of GW1 2010 are affected, in turn affecting sub-band 1 of beam 3 and sub-band 3 of beam 1 respectively.

Deployment Configurations

1. Across the Whole Board

The reconfiguration algorithm can compute the IR layout for the entire spectrum being served by one board on the GW. The board serves multiple RPs, and multiple beams. The constraints such as maximum number of IRs can be applied across all the entities being served by the board. Any change in the layout of a RP might affect all the others. Furthermore, the measure of power, link availability and service requirements across the different spot beams and RPs could vary significantly complicating the process of optimizing and thereby resulting in sub optimal solution to the layout.

2. Over One Spot Beam

A spot beam is restricted to all the terminals in a specific area or location. The user beam would have multiple RPs and multiple sub-bands. The distribution of the various factors, such as atmospheric conditions, for a spot beam is usually much less divergent as compared to a collection of beams. Since the number of IRs supported by a board is fixed, the IR number needs to be divided across each beam. The spot beam can be served by two different GWs and/or two different boards. If a beam is served by more than one board, the optimization and splitting of IRs becomes very cumbersome.

3. Over One RP

A RP is restricted to one spot beam. It might have 1 or more sub-bands. The RP will be served by one GW alone, but can be served by multiple boards. The varying factors are hence restricted drastically. Since the number of IRs supported by a board is fixed, the IR number needs to be divided across each RP.

4. Across One RP on One Board.

This is the smallest unit or construct over which the layout can be constructed. A proportionate partitioning of IRs that can be supported across the construct being optimized (2, 3, 4 options above) can be done based on:

1. Resource Pool priority (ResPoP)—this will be a fractional number between 0 and 1
2. Spectrum available in the construct across which the layout is being done
3. Clear sky power in the system. (optional)—a resource pool with a lower power measure will require the deployment of lower symbol rates. This addresses beams having different satellite parameters, or having different terminal hardware. If the RP supports lower symbol rate IRs, it will need more IRs across the same spectrum. This measure can be calculated from the SpecTab, as the average spectral efficiency over the beam normalized to the maximum spectral efficiency achievable.

$$N_{RP_i} = \lfloor factor_{RP_i} * Nc \rfloor;$$

$$factor_{RP_i} = \frac{ResPoP_{RP_i} * BW_{RP_i}}{BW_{board} * CSMeas_{RP_i}}; \sum factor_{RP_i} = 1$$

$N_{RP_i}$—maximum number of IRs for resource pool;

$N_c$—maximum IRs on the board;

$BW_{board}$—spectrum being supported by the board $ResPoP_{RP_i}$—resource pool priority for RP i;

For example, if a board is serving 3 beams, with each beam having 2 RPs with 200 MHz of spectrum per RP, then the board can serve a maximum of 100 IRs. If each RP has an equal priority, then each RP will receive 16 IRs. It should be noted, however, that the RP priority can be changed. If one RP has a priority of 'a', then another one should have a priority of 1/a. Choosing the priorities for the 6 RPs, as [1.5, 1.2, 1.1, 1/1.2, 1/1.1, 1/1.5], the distribution of IRs becomes [25, 33,50,]

Reconfiguring the IR Layout

The ICM (Inroute Configuration Manager) can be configured to implement various features by calculating the new configuration and sending it to the IDC (Inroute demodulator controller) to reconfigure the IDMs (Inroute demodulators). During reconfiguration, the IRs being reconfigured will be unusable. The BW assignment will be stopped for and after waiting for a RTT or THO (e.g. 15 frames of 45 ms) to receive all the pending bursts, the IDMs will be reprogrammed. The DC takes about 2 frames to program the channelizer configuration. Programming happens in parallel for all the channels. This programming does not include the time required to reload the FPGA firmware, which shall be required if some SCMA channels are moved to TDMA or vice versa or AERO to non-AERO or saturated OQPSK to Linear (this is not present for E24). Since there is a finite downtime associated with the inroutes that are being reconfigured, would have to minimize the number of changes and the number of inroutes that get changed every time there is an update. This implies that if the distribution of IRs and IGs is not being changed substantially, then this change should not occur.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 21:
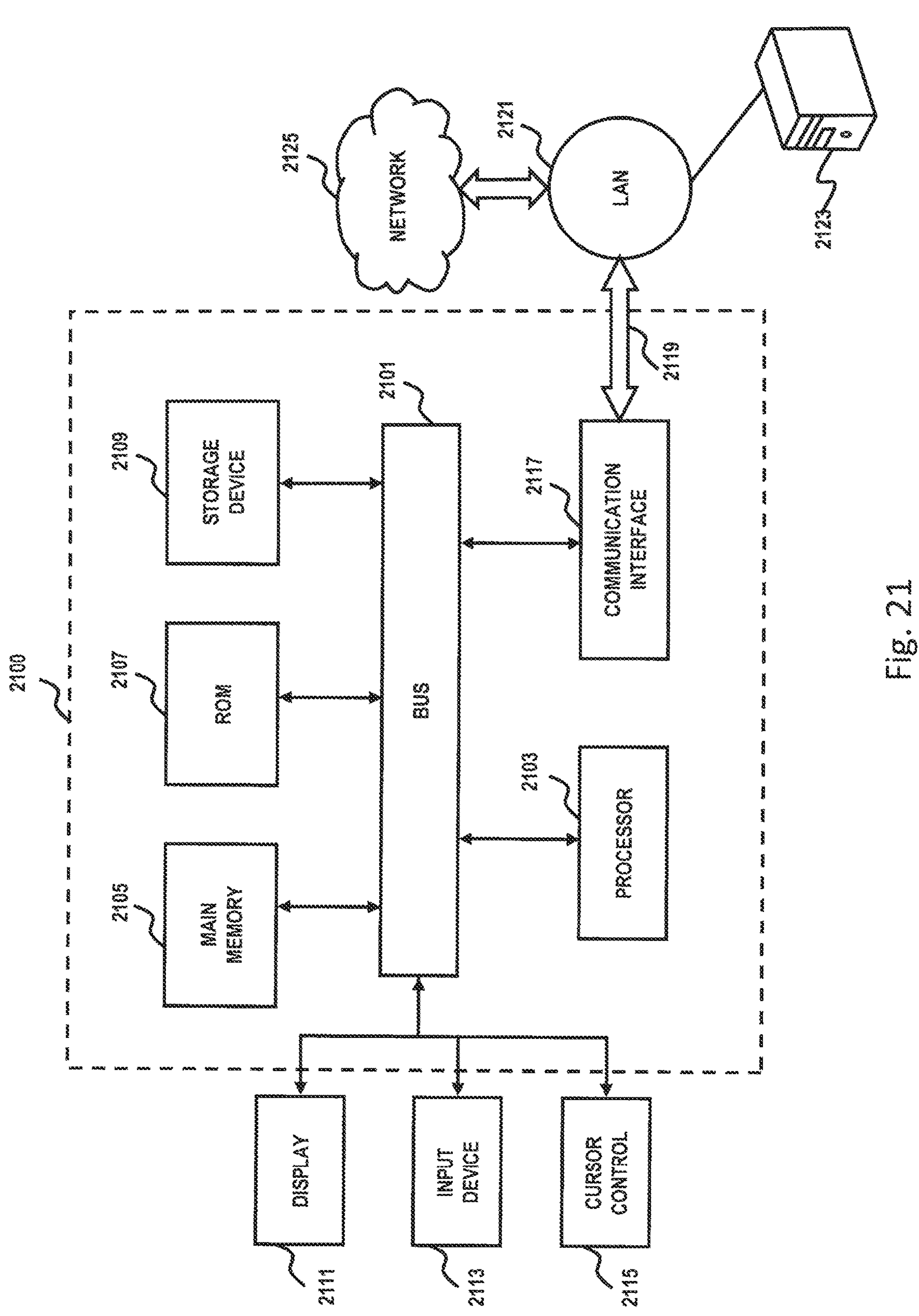
FIG. 21 is a diagram of a computer system that can be used to implement various exemplary features and embodiments.

FIG. 21 is a diagram of a computer system that can be used to implement features of various embodiments. The computer system 2100 includes a bus 2101 or other communication mechanism for communicating information and a processor 2103 coupled to the bus 2101 for processing information. The computer system 2100 also includes main memory 2105, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 2101 for storing information and instructions to be executed by the processor 2103. Main memory 2105 can also be used for storing temporary variables or other intermediate information during execution of instructions by the processor 2103. The computer system 2100 may further include a read only memory (ROM) 2107 or other static storage device coupled to the bus 2101 for storing static information and instructions for the processor 2103. A storage device 2109, such as a magnetic disk or optical disk, is coupled to the bus 2101 for persistently storing information and instructions.

The computer system 2100 may be coupled via the bus 2101 to a display 2111, such as a light emitting diode (LED) or other flat panel displays, for displaying information to a computer user. An input device 2113, such as a keyboard including alphanumeric and other keys, is coupled to the bus 2101 for communicating information and command selections to the processor 2103. Another type of user input device is a cursor control 2115, such as a mouse, a trackball, or cursor direction keys, for communicating direction information and command selections to the processor 2103 and for controlling cursor movement on the display 2111. Additionally, the display 2111 can be touch enabled (i.e., capacitive or resistive) in order facilitate user input via touch or gestures.

According to an exemplary embodiment, the processes described herein are performed by the computer system 2100, in response to the processor 2103 executing an arrangement of instructions contained in main memory 2105. Such instructions can be read into main memory 2105 from another computer-readable medium, such as the storage device 2109. Execution of the arrangement of instructions contained in main memory 2105 causes the processor 2103 to perform the process steps described herein. One or more processors in a multi-processing arrangement may also be employed to execute the instructions contained in main memory 2105. In alternative embodiments, hard-wired circuitry may be used in place of or in combination with software instructions to implement exemplary embodiments. Thus, exemplary embodiments are not limited to any specific combination of hardware circuitry and software.

The computer system 2100 also includes a communication interface 2117 coupled to bus 2101. The communication interface 2117 provides a two-way data communication coupling to a network link 2121 connected to a local network 2121. For example, the communication interface 2117 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 2117 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 2117 sends and receives electrical, electromagnetic, or optical signals that carry digital data streams representing various types of information. Further, the communication interface 2117 can include peripheral interface devices, such as a Universal Serial Bus (USB) interface, a High Definition Multimedia Interface (HDMI), etc. Although a single communication interface 2117 is depicted in FIG. 21, multiple communication interfaces can also be employed.

The network link 2121 typically provides data communication through one or more networks to other data devices. For example, the network link 2121 may provide a connection through local network 2121 to a host computer 2123, which has connectivity to a network 2125 such as a wide area network (WAN) or the Internet. The local network 2121 and the network 2125 both use electrical, electromagnetic, or optical signals to convey information and instructions. The signals through the various networks and the signals on the network link 2121 and through the communication interface 2117, which communicate digital data with the computer system 2100, are exemplary forms of carrier waves bearing the information and instructions.

The computer system 2100 can send messages and receive data, including program code, through the network (s), the network link 2121, and the communication interface 2117. In the Internet example, a server (not shown) might transmit requested code belonging to an application program for implementing an exemplary embodiment through the network 2125, the local network 2121 and the communication interface 2117. The processor 2103 may execute the transmitted code while being received and/or store the code in the storage device 2109, or other non-volatile storage for later execution. In this manner, the computer system 2100 may obtain application code in the form of a carrier wave.

The term "computer-readable medium" as used herein refers to any medium that participates in providing instructions to the processor 2103 for execution. Such a medium may take many forms, including but not limited to non-volatile media, volatile media, and transmission media. Non-volatile media include, for example, optical or magnetic disks, such as the storage device 2109. Non-volatile media can further include flash drives, USB drives, microSD cards, etc. Volatile media include dynamic memory, such as main memory 2105. Transmission media include coaxial cables, copper wire and fiber optics, including the wires that comprise the bus 2101. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 22:
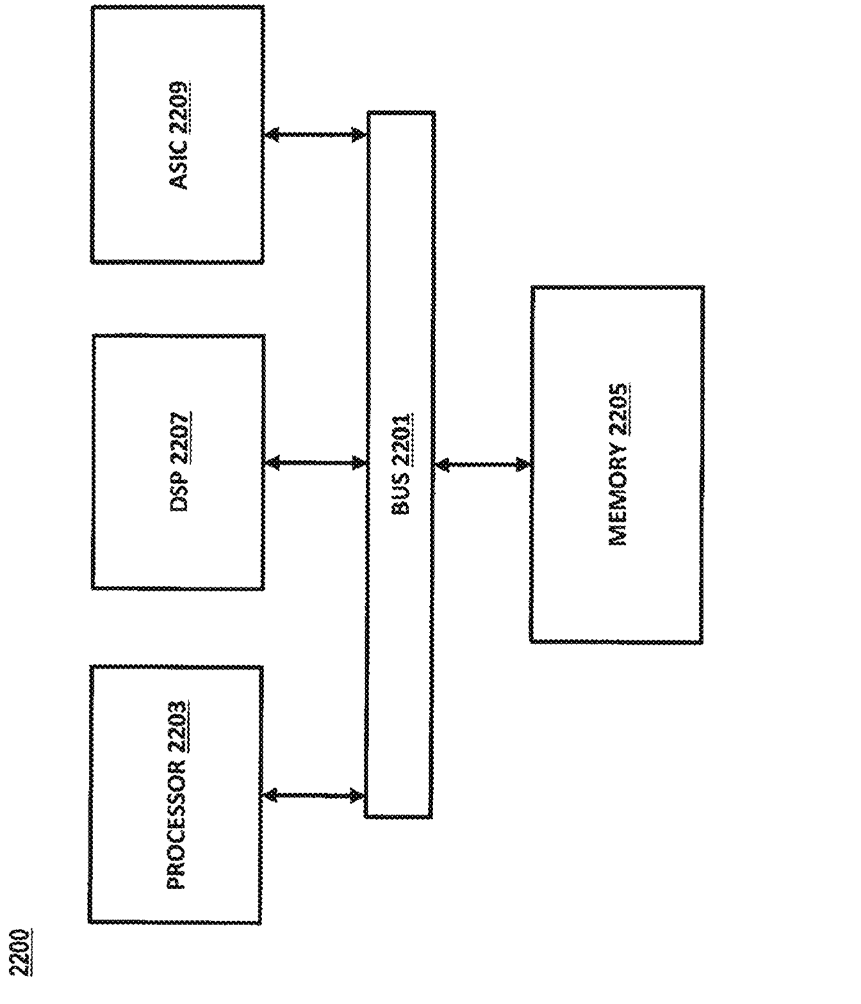
FIG. 22 is a diagram of a chip set that can be used to implement various exemplary features and embodiments.

FIG. 22 illustrates a chip set 2200 upon which features of various embodiments may be implemented. Chip set 2200 is programmed to implement various features as described herein and includes, for instance, the processor and memory components described with respect to FIG. 22 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 2200, or a portion thereof, constitutes a means for performing one or more steps of the figures.

In one embodiment, the chip set 2200 includes a communication mechanism such as a bus 2201 for passing information among the components of the chip set 2200. A processor 2203 has connectivity to the bus 2201 to execute instructions and process information stored in, for example, a memory 2205. The processor 2203 may include one or more processing cores with each core configured to perform independently. A multi-core processor enables multiprocessing within a single physical package. Examples of a multi-core processor include two, four, eight, or greater numbers of processing cores. Alternatively or in addition, the processor 2203 may include one or more microprocessors configured in tandem via the bus 2201 to enable independent execution of instructions, pipelining, and multithreading. The processor 2203 may also be accompanied with one or more specialized components to perform certain processing functions and tasks such as one or more digital signal processors (DSP) 2207, or one or more application-specific integrated circuits (ASIC) 2209. A DSP 2207 typically is configured to process real-world signals (e.g., sound) in real time independently of the processor 2203. Similarly, an ASIC 2209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2203 and accompanying components have connectivity to the memory 2205 via the bus 2201. The memory 2205 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 2205 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:

determining a set of factors for use in reconfiguring inroutes in a satellite communication system;

defining a state representative of inroute layouts based on the set of factors;

determining a metric for a current state representative of a current inroute layout;

optimizing the metric by:

performing a state search to identify a new state representative of a new inroute layout, and comparing a metric for the new state to a metric for a current or previous state until a convergence criteria is satisfied; and reconfiguring the inroute layouts of the satellite communication system to correspond with the inroute layouts represented by the new state.

2. The method of claim 1, wherein:

the satellite communication system comprises a fixed number of inroute groups; and the state is defined based on a number of inroutes contained in each inroute group.

3. The method of claim 1, wherein performing a state search comprises:

selecting a number of inroutes for each inroute group that is less than a maximum number of inroutes supported by the satellite communication system using a random distribution; and determining if a bandwidth occupied by all the selected inroutes is less than or equal to a total available bandwidth.

4. The method of claim 1, wherein performing a state search comprises:

selecting one or more static rules to define conditions corresponding to desired system performance metrics; and performing at least one of adding one inroute, deleting one inroute, and modifying the inroute layout until the conditions defined by the one or more static rules are satisfied.

5. The method of claim 1, wherein the set of factors is weighted based on system priority, performance, or both.

6. The method of claim 1, the state is defined based on a symbol rate for each inroute and a center frequency corresponding to each inroute.

7. The method of claim 6, wherein:

the symbol rate for each inroute is randomly selected from a set of supported symbol rates; and the center frequencies are randomly selected based, at least in part, on channel spacing.

8. The method of claim 1, wherein:

the state is defined based on a symbol rate for each inroute and a center frequency corresponding to each inroute; and performing a state search comprises selecting a neighbor state of the current state.

9. The method of claim 8, wherein performing a state search further comprises randomly performing one of adding one inroute, deleting one inroute, modifying one inroute symbol rate, and modifying one inroute center frequency.

10. The method of claim 1, further comprising:

portioning available spectrum of a user beam amongst multiple sub-bands having independent inroute layouts, wherein reconfiguring the inroute layouts comprises reconfiguring the inroute layouts of each sub-band.

11. The method of claim 10, wherein the portioning of the available spectrum amongst the sub-bands within the user beam can be dynamically redistributed.

12. An apparatus comprising:

one or more processors configured to:

determine a set of factors for use in reconfiguring inroutes in a satellite communication system;

define a state representative of inroute layouts based on the set of factors;

determine a metric for a current state representative of a current inroute layout;

optimize the metric by:

performing a state search to identify a new state representative of a new inroute layout, and comparing a metric for the new state to a metric for a current or previous state until a convergence criteria is satisfied; and reconfigure the inroute layouts of the satellite communication system to correspond with the inroute layouts represented by the new state.

13. The apparatus of claim 12, wherein:

the satellite communication system comprises a fixed number of inroute groups; and the one or more processors are configured to define the state based on a number of inroutes contained in each inroute group.

14. The apparatus of claim 12, wherein the one or more processors are configured to perform a state search by:

selecting a number of inroutes for each inroute group that is less than a maximum number of inroutes supported by the satellite communication system using a random distribution; and determining if a bandwidth occupied by all the selected inroutes is less than or equal to a total available bandwidth.

15. The apparatus of claim 12, wherein the one or more processors are configured to perform a state search by:

selecting one or more static rules to define conditions corresponding to desired system performance metrics; and performing at least one of adding one inroute, deleting one inroute, and modifying the inroute layout until the conditions defined by the one or more static rules are satisfied.

16. The apparatus of claim 12, the set of factors is weighted based on system priority, performance, or both.

17. The apparatus of claim 12, the state is defined based on a symbol rate for each inroute and a center frequency corresponding to each inroute.

18. The apparatus of claim 17, wherein the one or more processors are further configured to:

randomly select the symbol rate for each inroute from a set of supported symbol rates; and randomly select the center frequencies based, at least in part, on channel spacing.

19. The apparatus of claim 12, wherein:

the state is defined based on a symbol rate for each inroute and a center frequency corresponding to each inroute; and the one or more processors are further configured to perform a state search by selecting a neighbor state of the current state.

20. The apparatus of claim 19, wherein the one or more processors are further configured to perform a state search by randomly performing one of adding one inroute, deleting one inroute, modifying one inroute symbol rate, and modifying one inroute center frequency.

* * * * *